(12) United States Patent
Cha et al.

(10) Patent No.: US 11,231,516 B2
(45) Date of Patent: Jan. 25, 2022

(54) DIRECT MIGRATION OF SIMULTANEOUS-SOURCE SURVEY DATA

(71) Applicants: Young Ho Cha, Houston, TX (US); Dennis E. Willen, Conroe, TX (US)

(72) Inventors: Young Ho Cha, Houston, TX (US); Dennis E. Willen, Conroe, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 286 days.

(21) Appl. No.: 16/399,216

(22) Filed: Apr. 30, 2019

(65) Prior Publication Data

US 2019/0353814 A1 Nov. 21, 2019

Related U.S. Application Data

(60) Provisional application No. 62/671,754, filed on May 15, 2018.

(51) Int. Cl.
| | | |
|---|---|---|
| *G01V 1/34* | (2006.01) | |
| *G01V 1/28* | (2006.01) | |
| *G01V 1/36* | (2006.01) | |

(52) U.S. Cl.
CPC ............. *G01V 1/345* (2013.01); *G01V 1/282* (2013.01); *G01V 1/362* (2013.01); *G01V 2210/51* (2013.01); *G01V 2210/614* (2013.01)

(58) Field of Classification Search
CPC ........ G01V 1/282; G01V 1/345; G01V 1/362; G01V 2210/51; G01V 2210/614
See application file for complete search history.

(56) References Cited

U.S. PATENT DOCUMENTS

| | | |
|---|---|---|
| 7,679,990 B2 | 3/2010 | Herkenhoff et al. |
| 8,121,823 B2 | 2/2012 | Krebs et al. |
| 8,239,181 B2 * | 8/2012 | Lu .......................... G01V 3/12 703/10 |
| 8,688,381 B2 | 4/2014 | Routh et al. |

(Continued)

OTHER PUBLICATIONS

Gauthier, O. et al. (1986) "Two-Dimensional Nonlinear Inversion of Seismic Waveforms: Numerical Results," Geophysics, v.51, No. 7, Jul. 1986, pp. 1387-1403.

(Continued)

*Primary Examiner* — Elias Desta
(74) *Attorney, Agent, or Firm* — ExxonMobil Upstream Research Company—Law Department

(57) ABSTRACT

A method and apparatus for hydrocarbon management including generating an image of a subsurface formation by: obtaining simultaneous-source survey data, an earth model, and a first and a second velocity model of the subsurface formation; generating synthetic survey data with at least one of the earth model, the first velocity model, and the second velocity model. The method and apparatus may include directly migrating the simultaneous-source survey data; migrating the synthetic survey data; and subtracting the migrated synthetic survey data from the migrated simultaneous-source survey data. The method and apparatus may include subtracting the synthetic survey data from the simultaneous-source survey data; and directly migrating the result of the subtraction. The method and apparatus may include generating an artifact-reduced image.

29 Claims, 17 Drawing Sheets

(56) References Cited

U.S. PATENT DOCUMENTS

| | | | |
|---|---|---|---|
| 9,195,783 B2 | 11/2015 | Mullur et al. | |
| 9,207,351 B2 | 12/2015 | Dickens et al. | |
| 9,772,413 B2 * | 9/2017 | Krohn | G01V 1/005 |
| 10,578,755 B2 * | 3/2020 | Wang | G01V 1/282 |
| 2013/0238246 A1 | 9/2013 | Krebs et al. | |

OTHER PUBLICATIONS

Hampson, G. et al. (2008) "Acquisition Using Simultaneous Sources," *The Leading Edge*, Jul. 2008, pp. 918-923.

Huaien, W. et al. (1989) "Attenuation of Marine Coherent Noise," *SEG*, SP1.2, pp. 1112-1114.

Mensch, T. et al. (2014) "Acquisition of High Shot Density Blended Seismic Data: a WAZ Sea Trial," *76$^{th}$ EAGE Conf.* Amsterdam, The Netherlands, Jun. 16-19, 2014, 5 pages.

Metivier, L. et al. (2015) "Acoustic Multi-Parameter FWI for the Reconstruction of P-Wave Velocity, Density and Attenuation: Preconditioned Truncated Newton Appioach," *SEG Annual Mtg.*, New Orleans, LA, pp. 1198-1203.

Tang, Y. et al. (2009) "Least-Squares Migration/Inversion of Blended Data," *SEG Annual Mtg.*, Houston, TX, pp. 2859-2863.

Tchikanha, S. et al. (2012) "Flam—A Simultaneous Shooting Test in West Africa Deep Offshore," *74$^{th}$ EAGE Conf.-EUROPEC* 2012, Abstract, 1 page.

Wang, M. et al. (2016) "Advanced Deblending Scheme for Independent Simultaneous Source Data," *ASEG-PESA-AIG*, Adelaide, Australia, Aug. 21-24, 2016, pp. 564-568.

Xu, T. et al. (1995) "3-D Prestack Full-Wavefield Inversion," *Geophysics*, v.60, No. 6, pp. 1805-1818.

\* cited by examiner

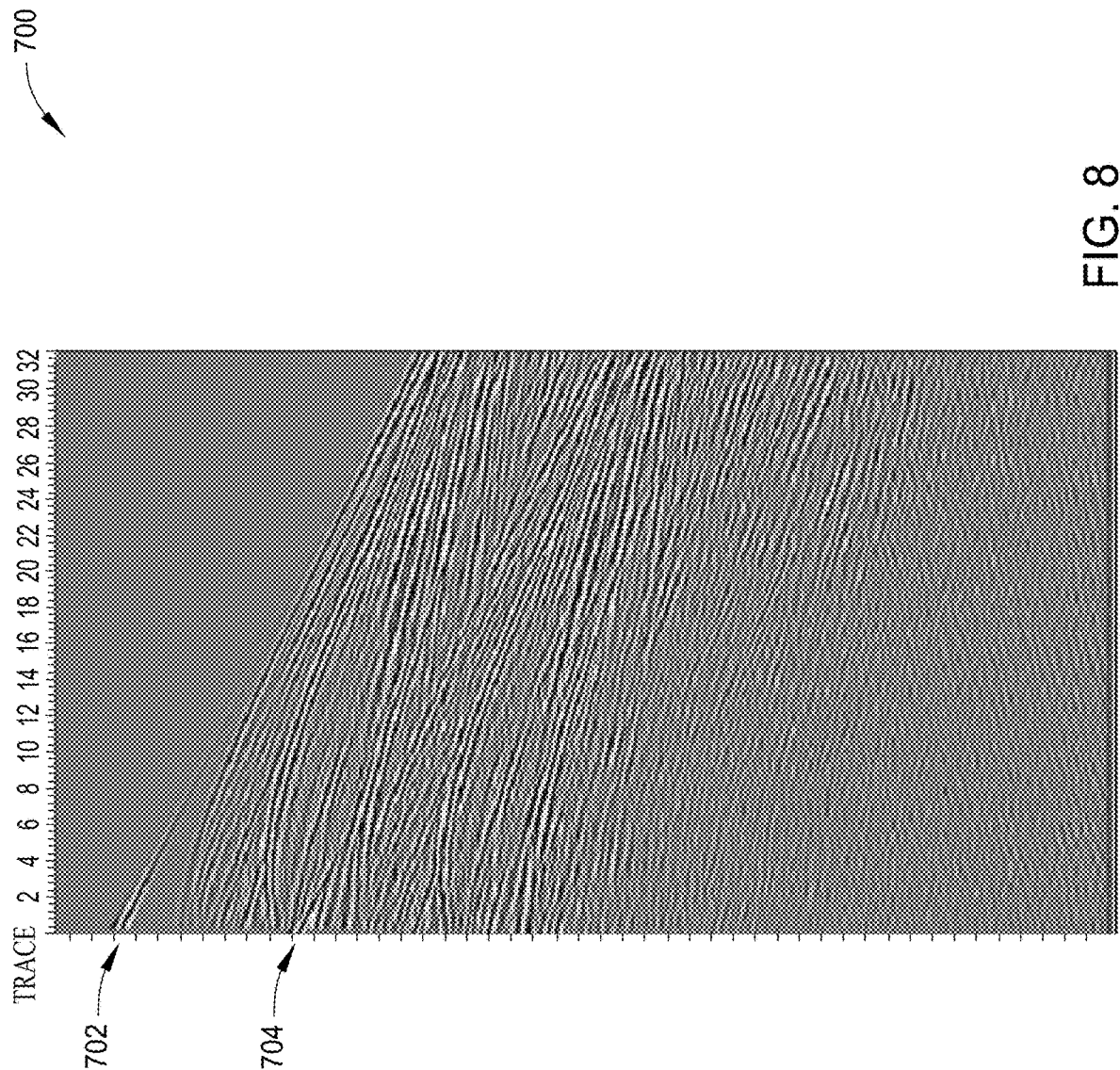

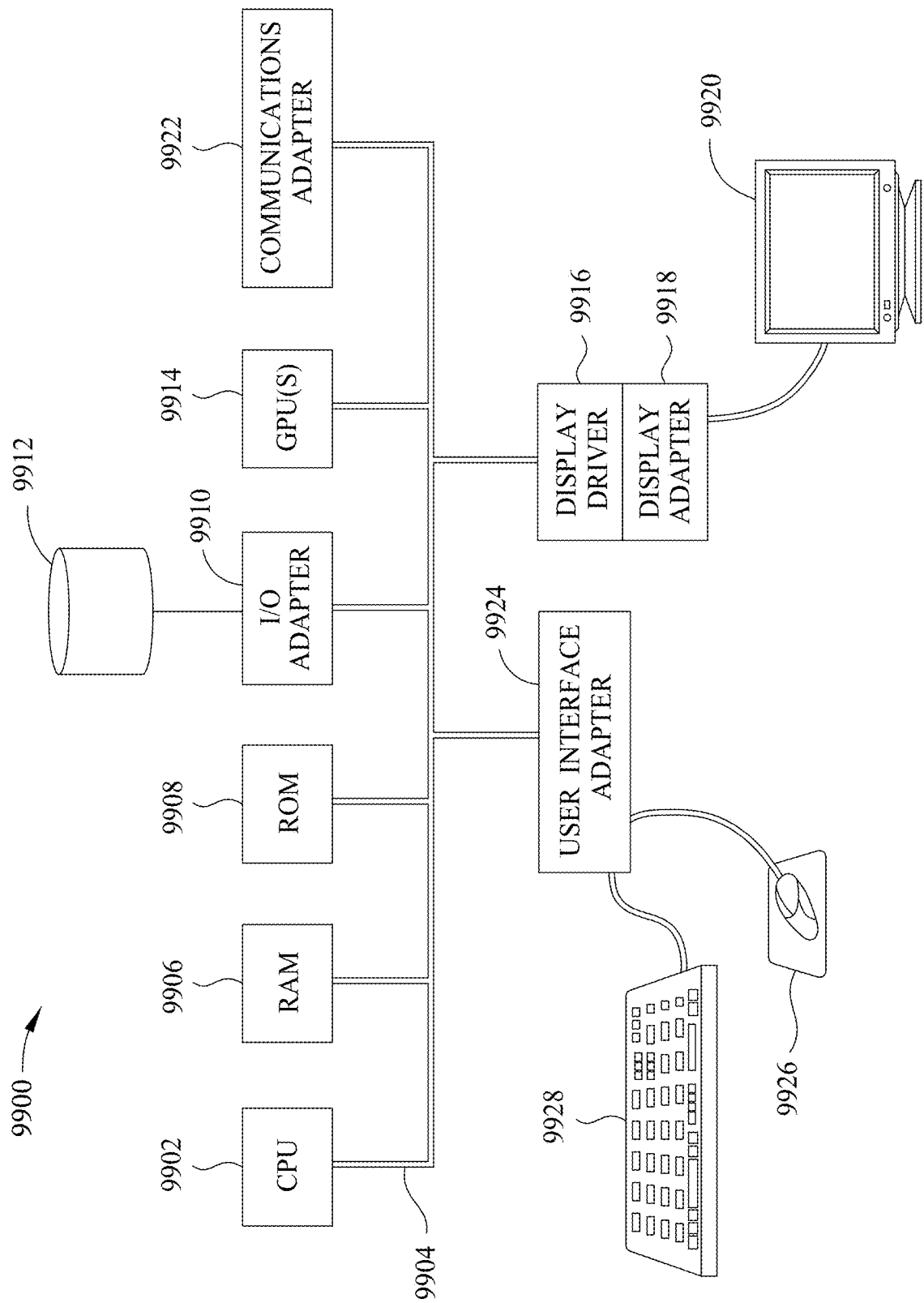

DIRECT MIGRATION OF SIMULTANEOUS-SOURCE SURVEY DATA

CROSS-REFERENCE TO RELATED APPLICATION

This application claims the benefit of U.S. Provisional Patent Application 62/671,754 filed May 15, 2018 entitled DIRECT MIGRATION OF SIMULTANEOUS-SOURCE SURVEY DATA, the entirety of which is incorporated by reference herein.

FIELD OF THE INVENTION

This disclosure relates generally to the field of geophysical prospecting and, more particularly, to seismic prospecting for hydrocarbon management and related data processing. Specifically, exemplary embodiments relate to improvements and methods for migrating simultaneous-source survey data.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of seismic prospecting is to accurately image subsurface structures commonly referred to as reflectors. Seismic prospecting is facilitated by acquiring raw seismic data during performance of a seismic survey. During a seismic survey, one or more seismic sources generate seismic energy (e.g., a controlled explosion or a sustained vibrational signal) which is delivered into the earth. Seismic waves are reflected from subsurface structures and are received by a number of seismic sensors or "receivers" (e.g., geophones). The seismic data received by the seismic sensors is processed in an effort to create an accurate mapping of the subsurface formation. The processed data is then examined with a goal of identifying geological structures that may contain hydrocarbons.

Simultaneous-source acquisition may increase the efficiency of a seismic survey by activating ("firing" or "shooting") multiple sources in succession and allowing their signals to overlap or interfere in time. The overlapping data can be exploited to lower data acquisition costs by spending fewer days in the field. It can also be used to improve image quality by illuminating the subsurface from multiple directions. The overlapping signals may come from multiple sources on (or towed-by) a single vessel or platform, sources on (or towed-by) different vessels or platforms, or a combination of both.

Simultaneous-source survey data poses problems for conventional seismic data processing algorithms, such as migration. Seismic migration creates images of the subsurface by back-propagating data into models (e.g., velocity models) of the subsurface from receiver locations and correlating against shot-time signatures (source activations) that have been forward-propagated into the subsurface model. Each simultaneous-source datum is the recorded sum of energy corresponding to two or more sources, including energy corresponding to multiple reflectors. When migrating simultaneous-source survey data, each shot wavefield may correctly image against the respective receiver data. Unfortunately, each shot wavefield may also be falsely correlated against receiver data generated by the other sources. These false correlations, or crosstalk, will not obey the correct travel time relationships to form an image and will, instead, appear as noise (e.g., artifacts) in the subsurface image.

Additionally, a frequent practice with conventional, single-shot data is to record the migrated image as a function of incidence angle at each subsurface location. Simultaneous-source survey data are often recorded from shots at different offsets, corresponding to different incidence angles in the subsurface. There is no simple way within conventional migration algorithms to separate the coincident contributions of sources with different offsets at the same receiver location.

A standard way to avoid the problems of crosstalk and/or offset mixing is to first separate the simultaneous-source survey data into its component shot records by a process known as "deblending." Generally, deblending includes a class of seismic processing techniques that attempt to reconstruct the data that would have been acquired with conventional, non-overlapping source activations. Deblending algorithms may first filter away the interference in some domain where interference appears random. Then, an inversion problem may be solved with the separate, deblended outputs. While deblending can work well for some data, it is inherently an underdetermined problem and relies on mathematical assumptions about the character of seismic data as well as sorting and filtering operations to tease apart the component shot records. Geologically-important signals may be mis-characterized as noise. Signals attenuated by deblending may be difficult or impossible to recover. Although the deblended shot records may be migrated without concern for either crosstalk or offset mixing, deblending is an approximate and time-consuming process. The approach may also result in significant computational expense and complexity when solving a large number of inversion problems with the twin objectives of ensuring that the output data have low levels of interference and successfully reconstruct the input simultaneous-source survey data.

New techniques for imaging with simultaneous-source survey data could beneficially reduce or mitigate the problems of crosstalk, offset mixing, and deblending. By resolving these problems, more accurate subsurface images could be utilized to more accurately and efficiently identify and/or characterize geological formations that potentially contain hydrocarbons.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 8 illustrates a simultaneous-source shot gather.

FIG. 15 illustrates a block diagram of a computer system upon which at least some of the present technological advancement may be embodied.

DETAILED DESCRIPTION

Figure 1B:
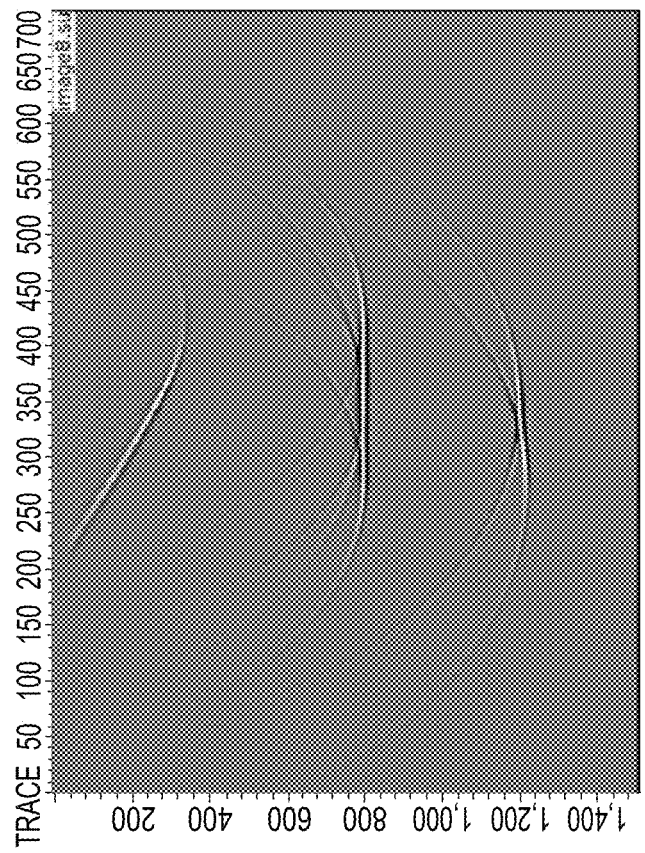
FIGS. 1A-1D illustrate an example of direct migration of simultaneous-source survey data.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation. The term "nominal" means as planned or designed in the absence of variables such as wind, waves, currents, or other unplanned phenomena. "Nominal" may be implied as commonly used in the field of seismic prospecting.

As used herein, Full Wavefield Inversion ("FWI") refers to a geophysical method which is used to estimate subsurface properties (such as velocity or density). FWI is known to be advanced for the higher resolution and more accurate physics compared to conventional methods. The fundamental components of FWI can be described as follows: using a starting subsurface physical properties model, synthetic survey data are generated by solving a wave equation (e.g., acoustic or elastic wave equations) using a numerical scheme (e.g., finite-difference, finite-element etc.). The synthetic survey data are compared with the field seismic data, and, using the differences between the two, the value of an objective function is calculated. The gradient directions of subsurface properties may be computed by back-propagating the differences and correlating with forward propagation for synthetic data generation. To minimize the objective function, a modified subsurface model is generated by utilizing the gradient directions, which is used to simulate a new set of synthetic survey data. This new set of synthetic survey data is compared with the field data to recalculate the value of the objective function. An objective function optimization procedure is iterated by using the new updated model as the starting model for finding another search direction, which will then be used to perturb the model in order to better explain the observed data. The process continues until an updated model is found that satisfactorily explains the observed data. A global or local optimization method can be used to minimize the objective function and to update the subsurface model. Commonly used local objective function optimization methods include, but are not limited to, gradient search, conjugate gradients, quasi-Newton, Gauss-Newton, and Newton's method. Commonly used global methods include, but are not limited to, Monte Carlo or grid search.

The terms "velocity model," "density model," "physical property model," or "earth model" as used herein refer to an array of numbers, typically a 3-D array, where each number, which may be called a model parameter, is a value of velocity, density, or another physical property in a cell, where a subsurface formation has been conceptually divided into discrete cells for computational purposes. Typically, an earth model will represent one or more physical properties, while a velocity model will represent only a single velocity property, such as compressional wave velocity (also known as pressure wave velocity or p-wave velocity). It should be understood that a velocity model may be better constrained than an earth model, and therefore, a velocity model may be estimated from seismic data.

As used herein, "direct migration" refers to migration of survey data without deblending prior to migration. It should be appreciated that conventional migration techniques applied to simultaneous-source data without prior deblending will necessarily produce spurious artifacts (e.g., crosstalk artifacts).

As used herein, "hydrocarbon management" or "managing hydrocarbons" includes hydrocarbon extraction, hydrocarbon production, hydrocarbon exploration, identifying potential hydrocarbon-bearing formations, characterizing hydrocarbon-bearing formations, identifying well locations, determining well injection rates, determining well extraction rates, identifying reservoir connectivity, acquiring, disposing of, and/or abandoning hydrocarbon resources, reviewing prior hydrocarbon management decisions, and any other hydrocarbon-related acts or activities.

In complex geological environments, wave equation migration is recognized to be an important technique for imaging seismic data. Wave equation migration comes in two forms, usually called WEM and RTM. In WEM ("Wave Equation Migration"), energy is back-propagated from the seismic receivers using a one-way wave equation, and forward-propagated from the corresponding seismic source. The wave fields are cross-correlated at image points to create the subsurface seismic image. This method can produce good images for reflectors with relatively shallow dip (the angle between a planar subsurface feature and a horizontal plane). In RTM ("Reverse Time Migration"), the wave field at the seismic receiver is back-propagated using a two-way wave equation, and cross-correlated with energy forward propagated from the source. This method can produce good images at all reflector dips, but may be more expensive than WEM by a factor typically in the range of 4-10.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, a "gather" refers to a display of seismic traces that share an acquisition parameter. For example, a common midpoint gather contains traces having a common midpoint, while a common shot gather contains traces having a common shot.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is that simultaneous-source survey data may be imaged using migration techniques without significant crosstalk noise. The imaging may include direct migration of the simultaneous-source survey data, without deblending prior to migration. Direct migration of the simultaneous-source data may better preserve signal and/or signal-to-noise ratio than conventional techniques (e.g., techniques that deblend prior to migration). Such improved seismic images may be useful to better identify structures that are likely to contain commercial quantities of hydrocarbons. Embodiments of the present disclosure can thereby be useful in the discovery, characterization, and/or extraction of hydrocarbons from subsurface formations.

Seismic migration techniques produce an image of the subsurface, typically using an estimate of seismic velocities in the subsurface. Migration produces these images by numerically matching possible travel paths from a source to a reflector to a receiver, with a recorded signal arriving at the time corresponding to each travel path. The travel paths are computed explicitly or implicitly using the estimated velocity. Recorded data that correspond to actual reflections tend to sum coherently to produce an image of subsurface strata. Data that do not correspond to reflections tend to sum incoherently and cancel. Migration algorithms differ greatly in methods for propagating shot time functions and receiver data back into the subsurface and, to a lesser extent, in methods for combining the propagated values to form images of the subsurface. Techniques disclosed herein are applicable to the broad spectrum of available migration algorithms.

The subsurface is often analyzed in more detail by creating migrated images that cover selected ranges of reflection angle at the strata. For example, migrated images may corresponding to the ranges 5°-15°, 15°-25°, and 25°-35°. The difference among these angle stack images can be used to distinguish oil-, gas-, and water-filled strata.

FWI may be used to create an initial earth model of the subsurface. "Earth model" generally refers to a numerical representation of some properties (e.g., velocity, acoustic velocity, shear velocity, density, attenuation, strata, anisotropy, etc.) as a function of location. Geophysical models often assume the earth generally consists of concentric, homogeneous, and isotropic layers within each of which the velocity varies smoothly. Typically, an earth model will represent at least one property (e.g. density) that cannot be estimated from seismic data, but rather is estimated from well log or other physical sampling information. FWI generally iteratively matches measured data to synthetic survey data, which may be generated from an approximation to the model and knowledge of the source activation. FWI creates and/or solves an inversion problem to find, inter alia, a model of the velocities of geologic strata along with respective locations and contrasts. The model may be iteratively updated with a requirement that the difference between measured data and synthetic survey data decrease with each iteration. Mathematical formulae may represent the iterative updates to the model based on the decreasing differences. Iterating this process adjusts the model, decreasing the difference between measured and synthetic survey data, and ultimately resulting in a difference that is sufficiently small, and/or a model that is sufficiently accurate. Various physical parameters can be included in the earth model, such as density, compressional velocity, shear velocity, anisotropy, and attenuation. FWI may be applied to conventionally-acquired or simultaneous-source survey data. Datasets having similar coverage, whether conventionally-acquired or acquired with simultaneous-source shooting, should produce similar earth models, to within the limit of numerical approximations. However, the earth model may be less accurate for deblended data due to additional approximations present in the deblending step. There are many techniques available to improve the accuracy and performance of FWI. Notable techniques might include the use of a cross-correlation objective function, the inclusion of attenuation among the FWI model parameters, and the application of 3D FWI as opposed to a 2D or 2.5D approximation.

Earth models generated by FWI can be highly accurate and detailed, providing valuable inputs to the seismic migration process, which utilizes velocity in order to back-propagate data from receiver locations and forward-propagate shot time signatures from their shot locations. As disclosed herein, FWI can be carried out directly (without prior deblending) on simultaneous-source survey data. In some embodiments, both FWI and migration are directly (without prior deblending) applied to simultaneous-source survey data, thereby enhancing the quality of the velocity model and seismic image while avoiding the computational expenses and risks from approximately deblending the data.

Techniques disclosed herein may be applied not only to removing artifacts in migrated images, but also to removing legitimate but otherwise unwanted components of the images. Data may be synthesized from any of the multiple shots, and then migrated with its corresponding shot time function. This results in synthetic survey data (e.g., an image) that can be subtracted from the simultaneous-source survey data. In some embodiments, the subtraction may be done while migrated images are being constructed, for example, as a function of incidence angle for the source of interest, or on a trace-by-trace basis. So long as the timing and locations of the different source activation are understood, the synthesis step can be accurately carried out for simultaneous-source survey data by standard methods such as finite differences or finite elements. Likewise, the mathematical analysis for updating the model is unchanged from that for conventional data.

Figure 1A:
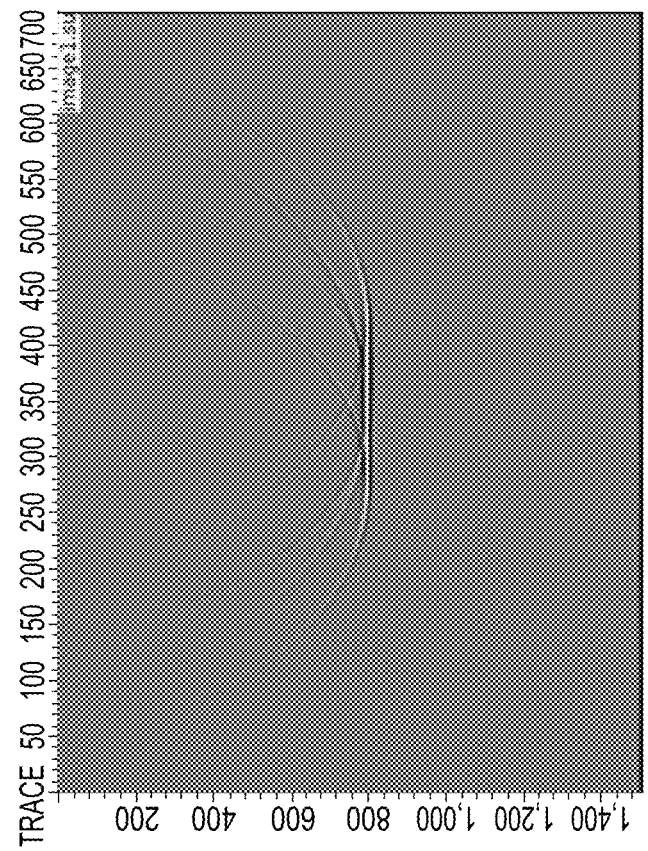
Figure 1D:
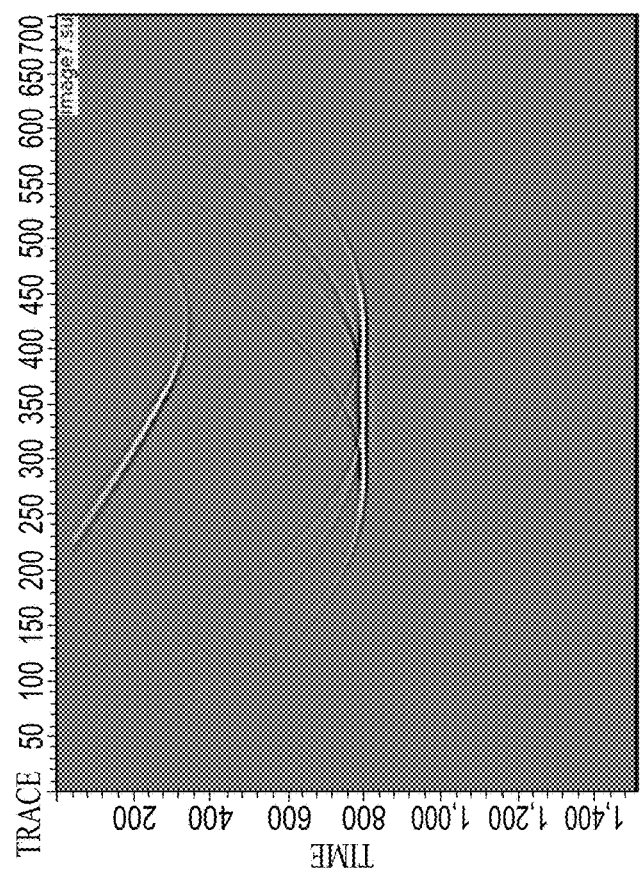
Figure 1C:
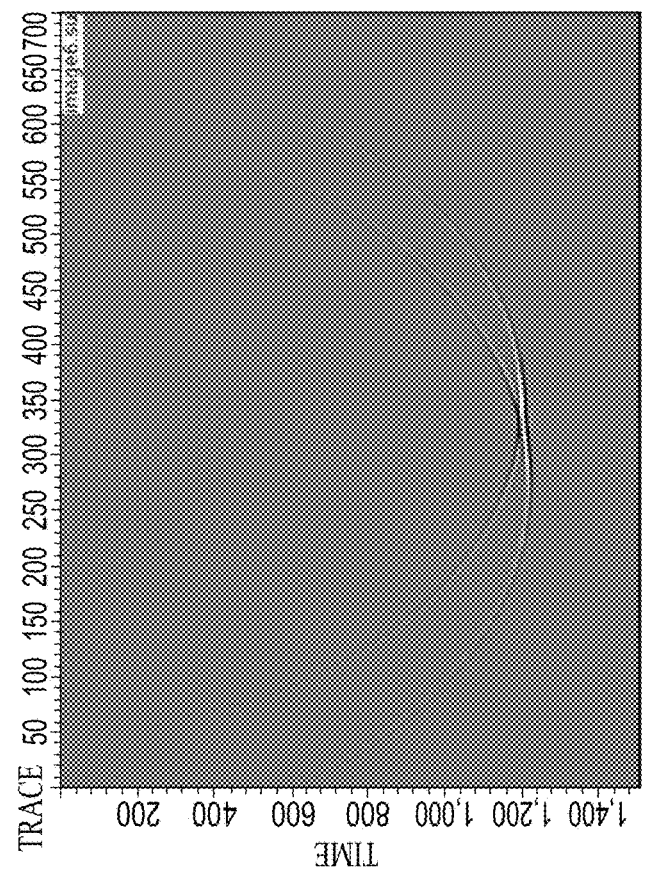

As an illustration of direct migration of simultaneous-source survey data, FIG. 1A shows a migrated imaged constructed from two conventional shot records. The bright white line near 800 ms corresponds to the actual location of a reflector and has been correctly imaged by migration. The shots are in different positions, but the receiver locations are the same for both records. FIG. 1B shows the result of acquiring and migrating both shot records (from FIG. 1A) as simultaneous-source survey data. In addition to the correct image at 800 ms, there are crosstalk artifacts near 200 ms and 1200 ms. FIG. 1C, an artifact-containing image, shows migrated synthetic survey data, including a synthetic crosstalk artifact generated by migrating one of the shot time functions (from FIG. 1A) together with synthetic data associated with the other shot. Because the synthetic crosstalk artifact appears deeper than the correct image, one knows that the synthetic crosstalk artifact corresponds to the earlier of the two shots migrated with the synthetic data from the later of the two shots. FIG. 1D, an artifact-reduced image, shows the result of subtracting the migrated synthetic survey data of FIG. 1C from the migrated simultaneous-source survey data of FIG. 1B.

The term "simultaneous-source" has been understood in various contexts in the geophysics literature. The seismic acquisition and deblending literature typically use "simultaneous-source acquisition" to indicate field measurements containing seismic data from two or more sources. The fact that seismic energy may propagate over great distances and long periods of time should cause no confusion to one skilled in the arts of seismic acquisition and processing. Simultaneous-source acquisition occurs when useful signals from different source activations arrive in the receiving apparatus at the same time. This would typically occur when the sources are within 10 km of each other and activated within 6 seconds of each other, although useful information may be recovered from sources separated by as much as 50 km and activated within 30 seconds of each other.

The FWI literature, on the other hand, usually employs "simultaneous-source" to describe data that have been artificially summed or blended after being recorded by conventional, single-source means. The advantage for FWI is that data from many shots (as many as 50 or more source activations) can be summed and then synthesized at the same time, resulting in considerable time and computational savings. This technique can be further improved by imposing random time or phase shifts on the source activations before summing, that is, by encoding the different source activations. This encoding technique avoids the long time periods that would be involved to actually acquire so many source activations, as well as the expense of deploying a large number of physical sources. However, this encoding technique suffers from two drawbacks: firstly, most marine seismic surveys are recorded by towing streamers containing many receivers. Summing data after acquisition, therefore, encounters a problem at the ends of the streamers where either earlier shot data is not available to sum with current shot data (because the receivers had not yet arrived at the location), or current shot data cannot be summed with earlier shot data (because the receivers have moved on from the location). This error compounds as the streamers keep moving and more source activations are summed, spoiling the computational savings that is sought by the method. The second drawback is that the activations must be encoded with relatively small time or phase shifts, typically averaging to zero. To do otherwise would increase the computational cost of synthesis and likewise give up the gains that are sought by the method. Smaller shifts result in less effective encoding, exacerbating the errors introduced and slowing the overall rate of convergence of the FWI iterations.

In contrast to the FWI encoding techniques, "simultaneous-source" acquisition herein refers to acquisition of overlapping data from a few (more than one but less than 8) source activations. The shots from different sources may be separated by small, random time shifts (known as "dithers" or "jitters"). Random dithers may be useful for deblending to help distinguish signal from noise in different shot domains. In some embodiments disclosed herein, dithers may be on the order of about 0 to about 2 seconds. The source activations may also be separated by a shot interval of several seconds. In some embodiments disclosed herein, shot intervals may be on the order of about 1 to about 16 seconds. In some embodiments, the activations from a single, rapidly-firing (e.g. shot interval between about 0.01 and about 0.50 seconds) source may be used. Under these conditions, receiver motion is believed to have negligible impact.

The techniques disclosed herein may be equally useful for imaging data acquired by marine or land seismic surveys, with impulsive or vibrational seismic sources, and/or with various acquisition geometries. The sources should be activated at known (within reasonable margin of error—typically on the order of meters) locations and timings. Receiver data may be recorded intermittently (e.g., corresponding to shot interval) or continuously. The techniques disclosed herein may solve the problems of crosstalk and offset-mixing by using an earth model to synthesize unwanted contributions (e.g., crosstalk artifacts) and subtracting them. The earth model may be generated by FWI.

Figure 2A:
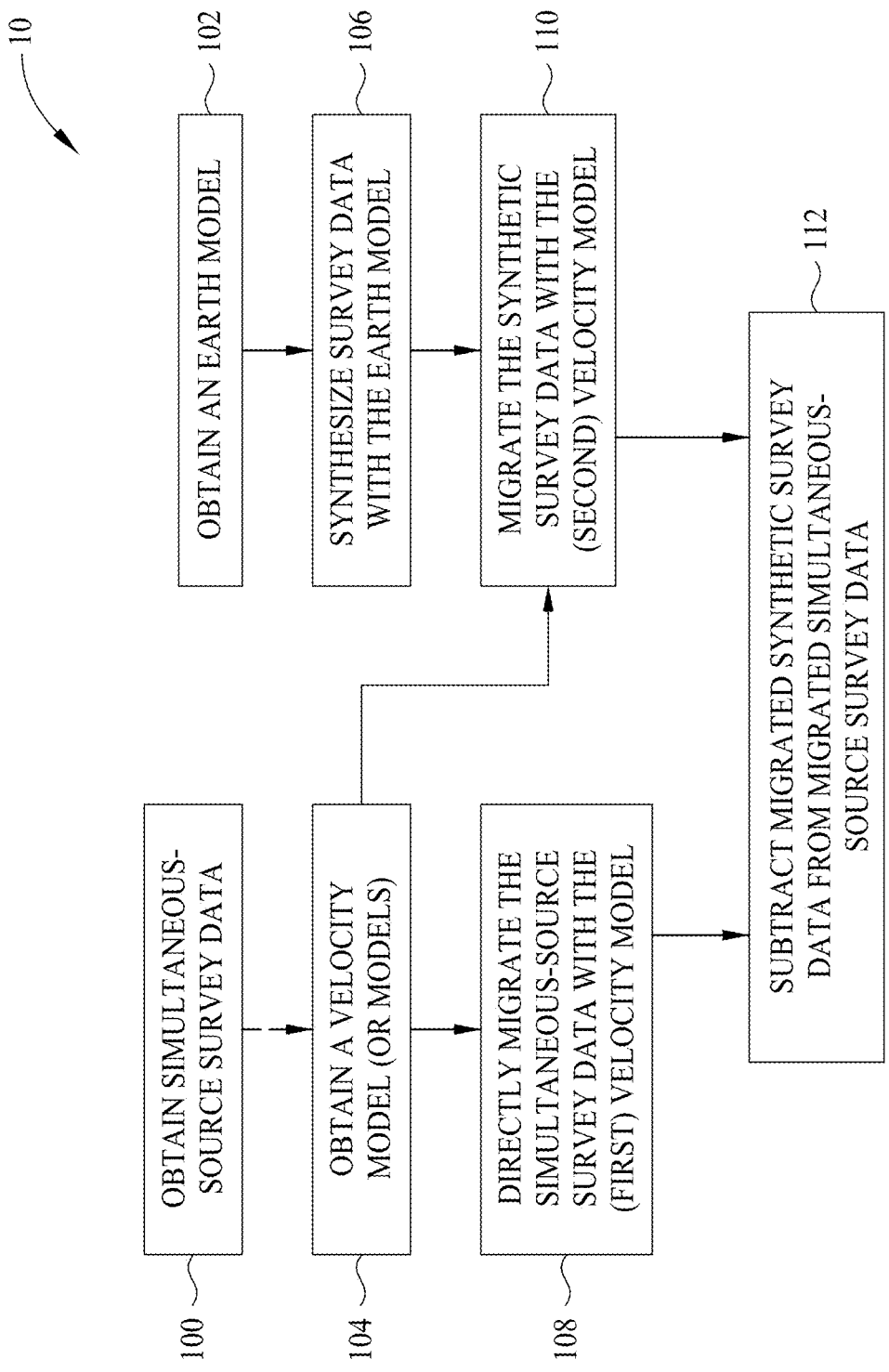
FIGS. 2A and 2B illustrate embodiments of methods utilizing direct migration of simultaneous-source survey data.

FIG. 2A is a flowchart illustrating an embodiment of a method utilizing direct migration of simultaneous-source survey data. The illustrated method 10 begins a first set of processes at block 100, wherein simultaneous-source survey data (e.g., compressional-wave seismic data, shear-wave seismic data, and/or multi-component seismic data) is obtained. The first set of processes continues at block 104, wherein a velocity model of the subsurface formation is obtained. The velocity model may be based on the simultaneous-source survey data obtained in block 100. In some embodiments, the velocity model may be based on alternative survey data (e.g., conventional, non-simultaneous-source survey data, or data from a different simultaneous-source survey) for the same subsurface formation. In some embodiments, the velocity model may account for earth elastic effects by including shear-wave velocity in some parameterization. The first set of processes continues at block 108, wherein the simultaneous-source survey data is directly migrated with the velocity model. Note that the simultaneous-source survey data has not been deblended prior to the migration at block 108. The migration results in an artifact-containing image of the subsurface formation. The illustrated method 10 begins a second set of processes at block 102, wherein an earth model of the subsurface formation is obtained. Note that, as used herein, references to the "first" and "second" set of processes are for distinguishing between two sets of processes, and do not imply or indicate an order of performing the two sets of operations. In some embodiments, the earth model may contain details (e.g., strata) to mimic reflections in field data. In some embodiments, the velocity model may be smoother than the earth model. Nonetheless, the earth model may be suitable to image the simultaneous-source survey data with migration. (As would be understood by one of ordinary skill in the art with the benefit of this disclosure, the suitability of an earth model for imaging survey data may be determined by running a test case to measure error produced in the test image. For example, simulated data may be imaged with the test earth model and compared to measured data. The test may result in error below a selected threshold and/or a reasonably flat migration gather, therefor indicating the suitability of the test earth model for imaging the survey data.) In some embodiments, the earth model may account for earth elastic effects by including shear-wave velocity in some parameterization. The second set of processes continues at block 106, wherein the earth model is used to numerically synthesize survey data (e.g., compressional-wave seismic data, shear-wave seismic data, and/or multi-component seismic data). For example, synthetic survey data may be generated by solving a wave equation (e.g., acoustic or elastic wave equation) using a numerical scheme (e.g., finite-difference, finite-element, etc.) The second set of processes continues at block 110, wherein the synthetic survey data is migrated with the velocity model to generate an image with synthetic artifacts. At block 112, the migrated synthetic survey data is subtracted from the migrated simultaneous-source survey data to produce an artifact-reduced image.

Those familiar with the arts of seismic acquisition and imaging and, in particular, with simultaneous-source acquisition and with migration, will be aware of many possible implementations of the flowchart in FIG. 2A. For example, simultaneous-source survey data might be in the form of triple- or penta-source survey data acquired by a single survey vessel or from multiple survey vessels generating overlapping seismic data, such as in narrow-azimuth, wide-azimuth, coil, or ocean-bottom surveys. The earth model may have been developed from the same or alternative survey data, such as conventional seismic, gravity, magnetic, resistivity, or well log data. The earth model may contain a variety of physical parameters, such as compressional velocity, shear velocity, density, attenuation, and impedance, as well as their spatial relationships, including faults and other geologic information. Known geologic concepts regarding earth strata may have influenced the earth model, as well. The velocity model may have been informed by the earth model, and/or by well-known processing operations on the simultaneous-source survey data and/or conventional seismic data. In some embodiments, the velocity model may simply be the earth model, or a subset thereof. The synthetic survey data may have been computed by mathematical methods such as ray-tracing, finite differences, and finite elements. The synthetic survey data may have been conventionally (non-simultaneous-source) created to simplify the generation of migrated artifacts in the migrated synthetic survey data. The synthetic survey data may have been created in a blended form and then deblended prior to migration. Migration at block 108 and/or block 110 may include any one of many migration techniques, such as reverse-time migration, wave-equation migration, Kirchhoff migration, or elastic migration. Subtraction at block 112 may include adaptive subtraction or other forms of subtraction. The same velocity model may be used at block 108 and block 110, or, in some embodiments, two different velocity models may be used.

Figure 2B:
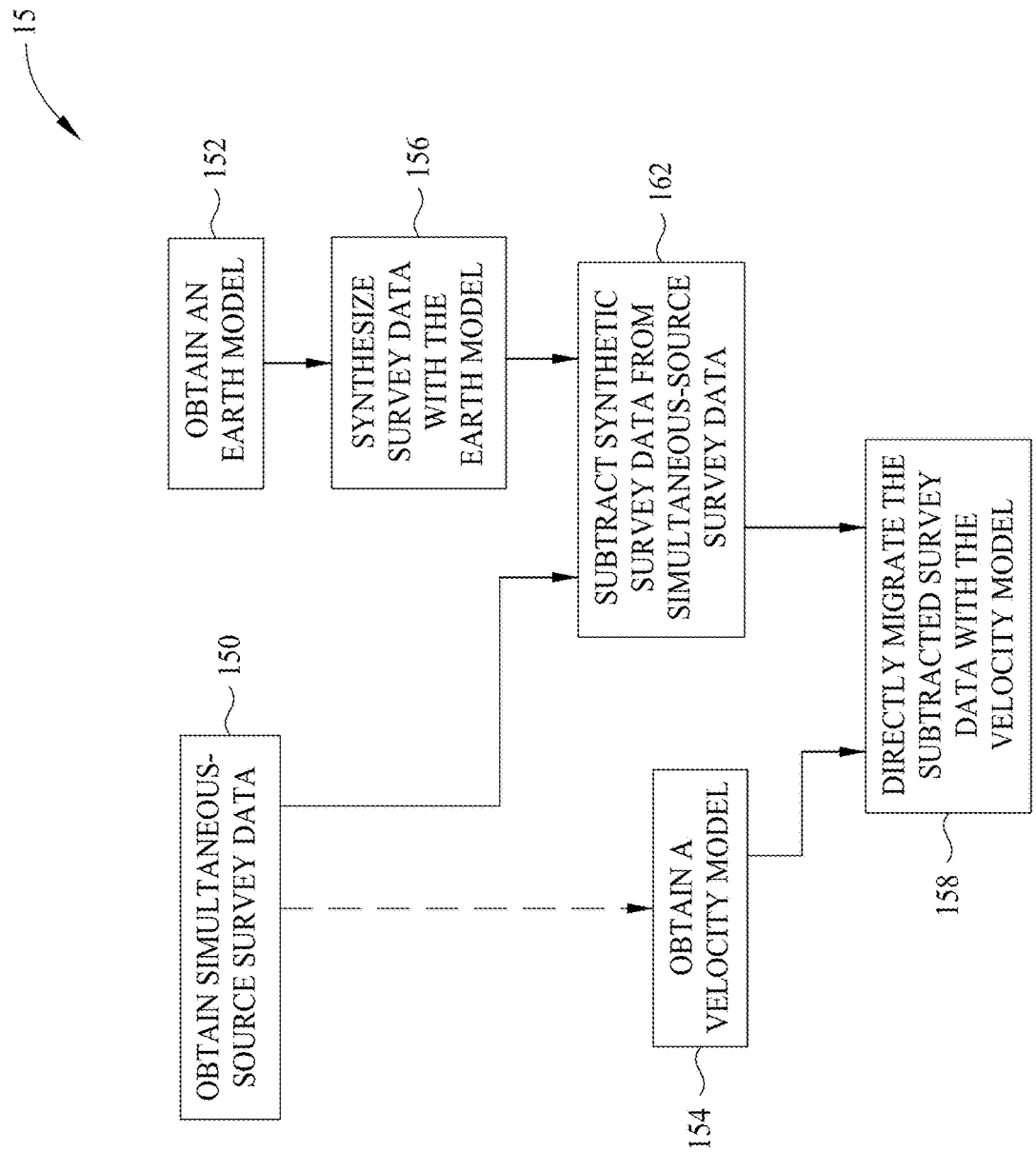

There are mathematically equivalent methods to achieve the benefits of the flowchart in FIG. 2A. For example, in a Kirchhoff migration scenario, where simultaneous-source traces are migrated once for each contributing source, appropriate subsets of synthetic survey data could be subtracted directly from simultaneous-source survey data to produce an artifact-reduced image with a single migration step. That is, under some circumstances, the process could proceed by differencing data pre-migration rather than differencing post-migration images. FIG. 2B is a flowchart illustrating such a method. The illustrated method 15 begins a first set of processes at block 150, wherein simultaneous-source survey data is obtained. In some embodiments, the first set of processes also includes block 154, wherein a velocity model of the subsurface formation is obtained, the velocity model being based on the simultaneous-source survey data obtained in block 150. In some embodiments, the velocity model may be based on alternative survey data (e.g., conventional, non-simultaneous-source survey data, or data from a different simultaneous-source survey) for the same subsurface formation. The illustrated method 15 begins a second set of processes at block 152, wherein an earth model of the subsurface formation is obtained. The second set of processes continues at block 156, wherein the earth model is used to synthesize survey data. Information from the first set of processes and the second set of processes is utilized at block 162, wherein the synthetic survey data is subtracted from the simultaneous-source survey data. At block 158, the result of the subtraction is then directly migrated with the velocity model to produce an artifact-reduced image. Note that the result of the subtraction of the synthetic survey data from the simultaneous-source survey data has not been deblended prior to the migration at block 158.

In some embodiments, FWI may be utilized at block 102 in FIG. 2A and/or block 152 in FIG. 2B to generate the earth model. Unlike conventional migration, FWI can successfully operate directly (without prior deblending) on simultaneous-source survey data, updating the earth model until yielding synthetic survey data that match the simultaneous-source survey data. In some embodiments, the synthetic survey data may be generated in conventional, single-source style, and then blended to match the simultaneous-source survey data. In some embodiments, the synthetic survey data may be created directly in simultaneous-source form. In some embodiments, deblended simultaneous-source survey data may be utilized at block 102 to generate the earth model. In some embodiments, simultaneous-source survey data may be directly utilized (without deblending) to generate the earth model. In some embodiments, FWI may be applied to only a portion of the simultaneous-source survey data and/or to an alternate dataset over the same general subsurface formation.

In some embodiments, FWI may be utilized at block 104 in FIG. 2A and/or block 154 in FIG. 2B to generate velocity models for migration. While the FWI earth model may contain additional parameters, such as density or impedance, at a minimum the FWI earth model will contain velocities which explain the dynamic behavior of the data. The FWI earth model will, therefore, produce a useful image when used with migration. Likewise, since FWI uses the earth model to generate synthetic survey data which match the simultaneous-source survey data, its earth model will synthesize the artifacts caused by migrating the simultaneous-source survey data.

Figure 3A:
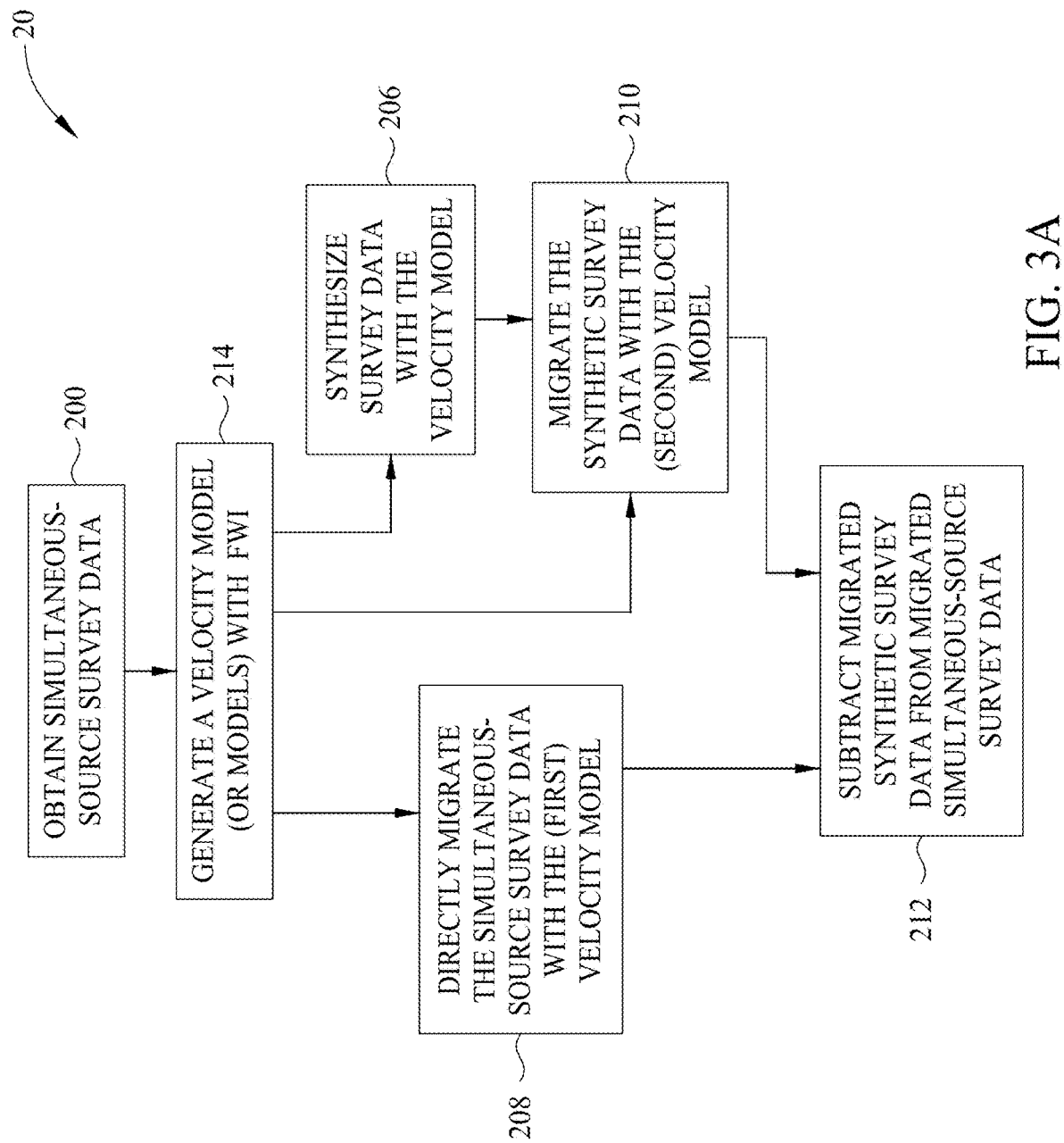
FIGS. 3A and 3B illustrate embodiments of additional methods utilizing direct migration of simultaneous-source survey data.

FIG. 3A is a flowchart illustrating an embodiment of another method utilizing direct migration of simultaneous-source survey data. The illustrated method 20 begins at block 200, wherein simultaneous-source survey data (e.g., compressional-wave seismic data, shear-wave seismic data, and/or multi-component seismic data) is obtained (similar to block 100 in FIG. 2A). The method 20 continues at block 214, wherein FWI is applied to the simultaneous-source survey data to generate the velocity model. (This replaces blocks 102 and/or 104 from FIG. 2A, wherein an earth model and/or a velocity model are/is obtained.) Similar to block 108 in FIG. 2A, at block 208, the method 20 continues, wherein the simultaneous-source survey data is directly migrated with the velocity model. Note that the simultaneous-source survey data has not been deblended prior to the migration at block 208. The migration results in an artifact-containing image of the subsurface formation. The illustrated method 20 continues at block 206, wherein the velocity model is used to synthesize survey data (e.g., compressional-wave seismic data, shear-wave seismic data, and/or multi-component seismic data). The method 20 continues at block 210 (similar to block 110 in FIG. 2A), wherein the synthetic survey data is migrated with the velocity model to generate an image with synthetic artifacts. At block 212 (similar to block 112 in FIG. 2A), the migrated synthetic survey data is subtracted from the migrated simultaneous-source survey data to produce an artifact-reduced image.

As before, those familiar with the arts of seismic acquisition and imaging will be aware of many possible implementations of the flowchart in FIG. 3A. For example, the synthetic survey data may have been conventionally created, or the synthetic survey data may have been created in a blended form and then deblended prior to migration. The same velocity model may be used at block 208 and block 210, or, in some embodiments, two different velocity models may be used. In some embodiments, FWI may be utilized at block 214 to generate an earth model, and the earth model may then be used in block 206 to generate the synthetic survey data.

Figure 3B:
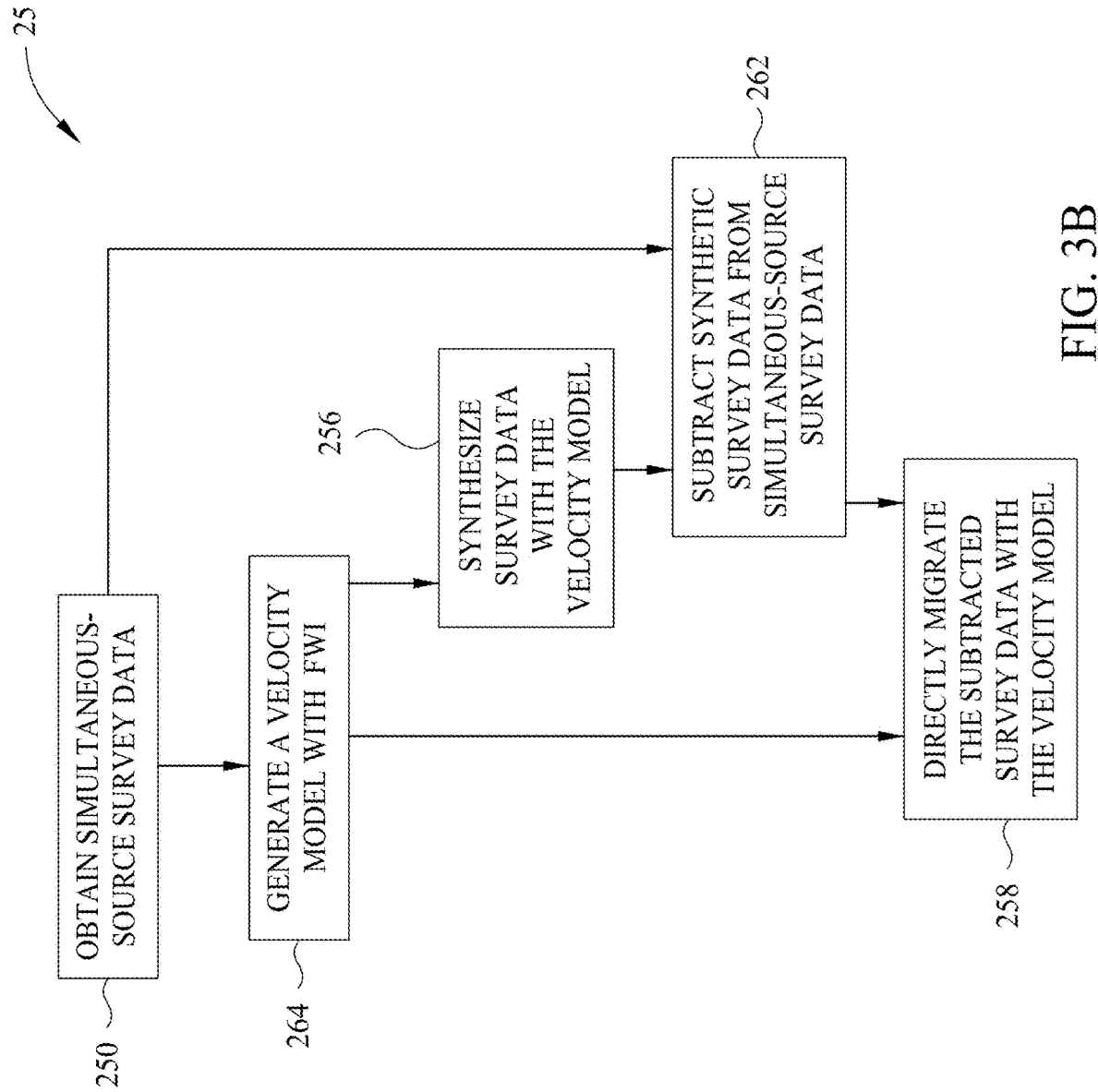

Again, a mathematically equivalent alternative method includes subtracting synthetic survey data from simultaneous-source survey data to obtain the artifact-reduced image with a single migration step. FIG. 3B is a flowchart illustrating such a method. The illustrated method 25 begins at block 250, wherein simultaneous-source survey data is obtained. The method 25 continues at block 264, wherein FWI is applied to the simultaneous-source survey data to generate the velocity model. The illustrated method 25 continues at block 256, wherein the velocity model is used to synthesize survey data. The illustrated method 25 continues at block 262, wherein the synthetic survey data is subtracted from the simultaneous-source survey data. At block 258, the result of the subtraction is then directly migrated with the velocity model to produce an artifact-reduced image. Note that the result of the subtraction of the synthetic survey data from the simultaneous-source survey data has not been deblended prior to the migration at block 258.

Figure 4:
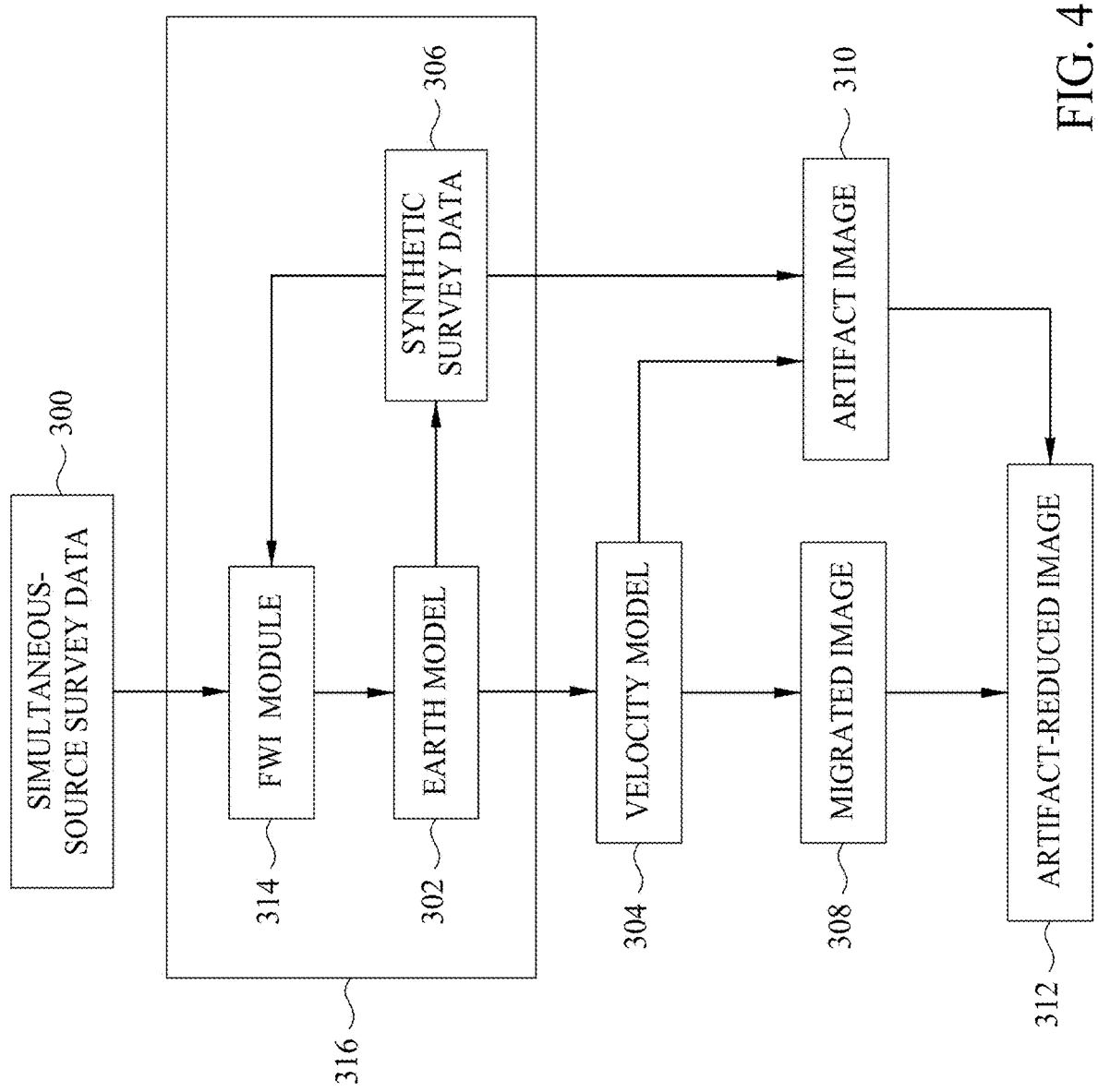
FIG. 4 illustrates interactions between components of a system embodiment for direct migration of simultaneous-source survey data.

FWI is an iterative process of updating an earth model to produce synthetic survey data which matches acquired data. This earth model may contain additional parameters beyond the velocity or velocities of interest to migration, including, but not limited to, density, attenuation, and impedance. Furthermore, the synthetic survey data generated by FWI can be used directly to simulate the migration artifacts, resulting in some savings of time and computational resources. FIG. 4 illustrates interactions of various system components during the processes discussed above. Simultaneous-source survey data 300 may be obtained, for example, from a new seismic survey or from a library of previously-conducted seismic surveys. The simultaneous-source survey data 300 may be utilized to generate an earth model 302, thereby starting inversion loop 316. For example, a FWI module 314 may operate on the simultaneous-source survey data 300 to generate an initial earth model 302. The earth model 302 may be utilized to generate synthetic survey data 306. The FWI module 314 may then compare the synthetic survey data 306 to simultaneous-source survey data 300. The comparison may result in an iterative update to the earth model 302 in inversion loop 316. A velocity model 304 may be developed from the earth model 302 as an exit from inversion loop 316. The velocity model 304 may be applied to the simultaneous-source survey data 300 to produce a migrated image 308 (with artifacts) and an artifact image 310. Artifact image 310 can be produced from the same synthetic survey data 306 that was generated during the inversion loop 316. An artifact-reduced image 312 can be created by subtracting artifact image 310 from migrated image 308.

Figure 5:
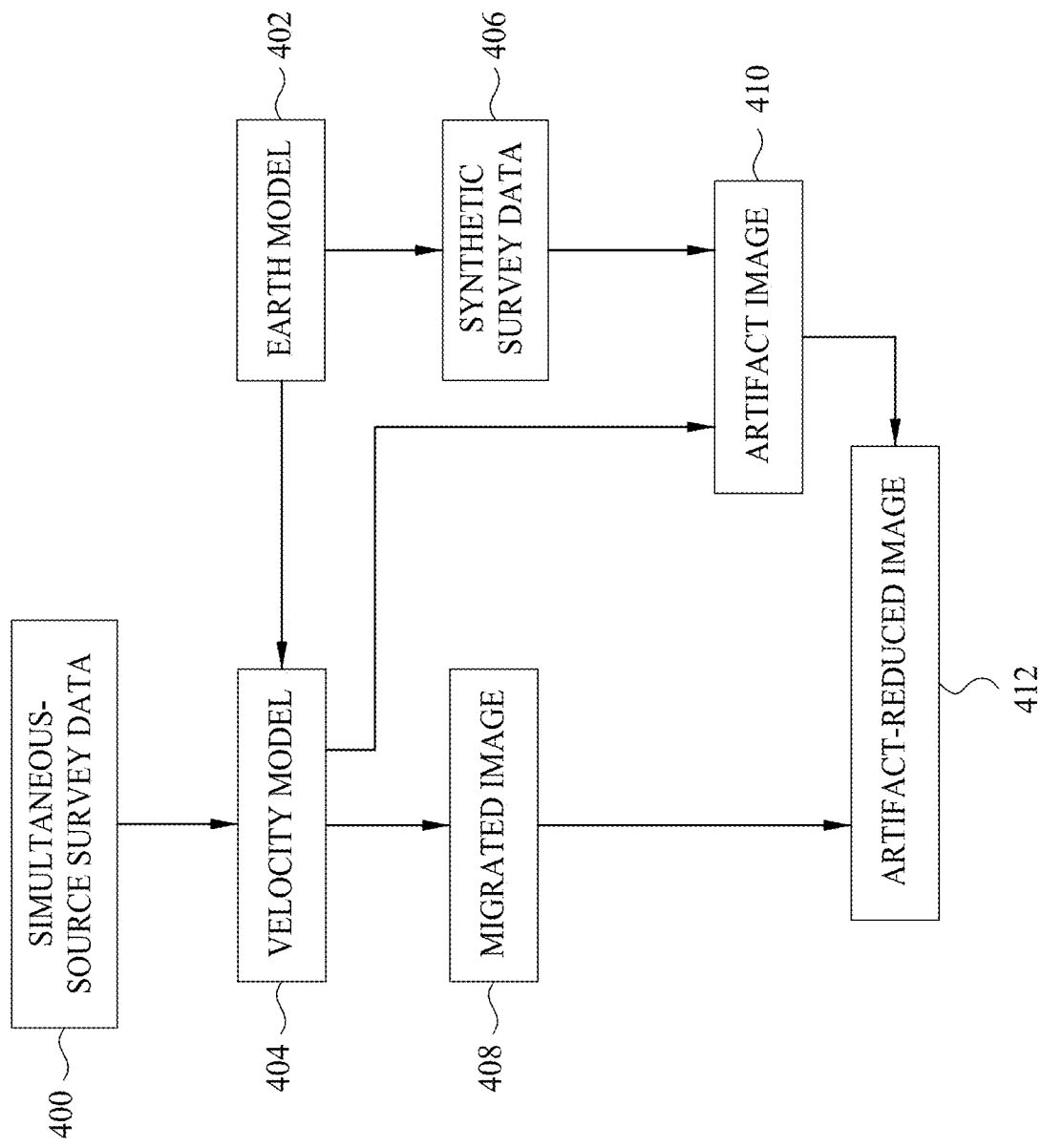
FIG. 5 illustrates interactions between components of another system embodiment for direct migration of simultaneous-source survey data.

In addition to FWI, there are a variety of geophysical methods to develop earth models and/or velocity models. In some embodiments, rather than generating the models by FWI, it is possible to generate acceptable models by other means, such as by least-squares migration. FIG. 5 illustrates interactions of various system components when FWI is not utilized. Simultaneous-source survey data 400 may be subjected to semblance analysis, tomography, and/or focusing analysis to directly develop a velocity model 404. In some embodiments, earth model 402 is input to the velocity model 404. For example, earth model 402 may contain information from additional geophysical data and geologic concepts related to the subsurface formation. Synthetic survey data 406 may be generated from earth model 402. The synthetic survey data 406 may be migrated using velocity model 404 to produce artifact image 410. Simultaneous-source survey data 400 may be migrated using velocity model 404 to produce migrated image 408. Artifact image 410 may be subtracted from migrated image 408 to produce an artifact-reduced image 412.

Figures 6, 7:
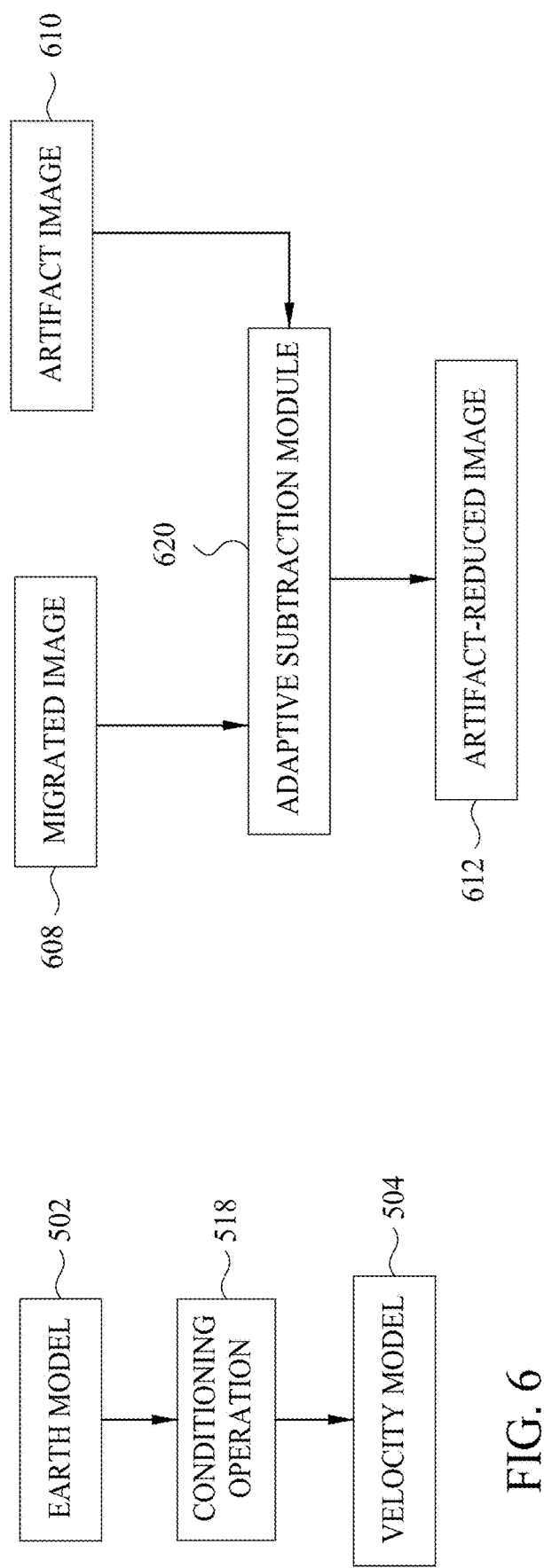
FIG. 6 illustrates interactions between components of another system embodiment for direct migration of simultaneous-source survey data.
FIG. 7 illustrates interactions between components of another system embodiment for direct migration of simultaneous-source survey data.

FIG. 6 illustrates interactions of various system components when the earth model is input to the velocity model. For example, conditioning operations 518 may be applied (e.g., conditioning) to earth model 502 to generate velocity model 504. As would be understood by one of ordinary skill in the art with the benefit of this disclosure, the earth model may include data from any domain. Consequently, the data may need to be converted from a time domain to a depth domain to generate a velocity model. Similarly, the earth model data may need to be smoothed and/or de-noised to generate a velocity model. Conditioning operations 518 may include, but are not limited to, smoothing, dip filtering, de-noising, time-depth conversion, and tying to well logs. For example, well-log measurements may be used to inform the migration velocity model of velocity anisotropy in the subsurface.

FIG. 7 illustrates interactions of various system components when techniques beyond simple subtraction are utilized to generate an artifact-reduced image. For example, adaptive subtraction module 620 may be utilized to subtract artifact image 610 from migrated image 608, producing artifact-reduced image 612. In a simple form, the adaptive subtraction module 620 may involve the determination of a weighting factor to be applied to the artifact image 610, perhaps by a least-squares technique. More sophisticated methods will be apparent to those skilled in the art, such as subtractions in the spatial or temporal frequency domains to account for differences in the frequency content of the synthetic survey data and the original simultaneous-source survey data.

FIG. 8 shows a plot of simultaneous-source survey data 700. As illustrated, receiver number is plotted along the horizontal axis, and time is plotted on the vertical axis. Those skilled in the art will recognize the presence of data from two different sources, based on their direct-arrival data at times 702 and 704.

Figure 9:
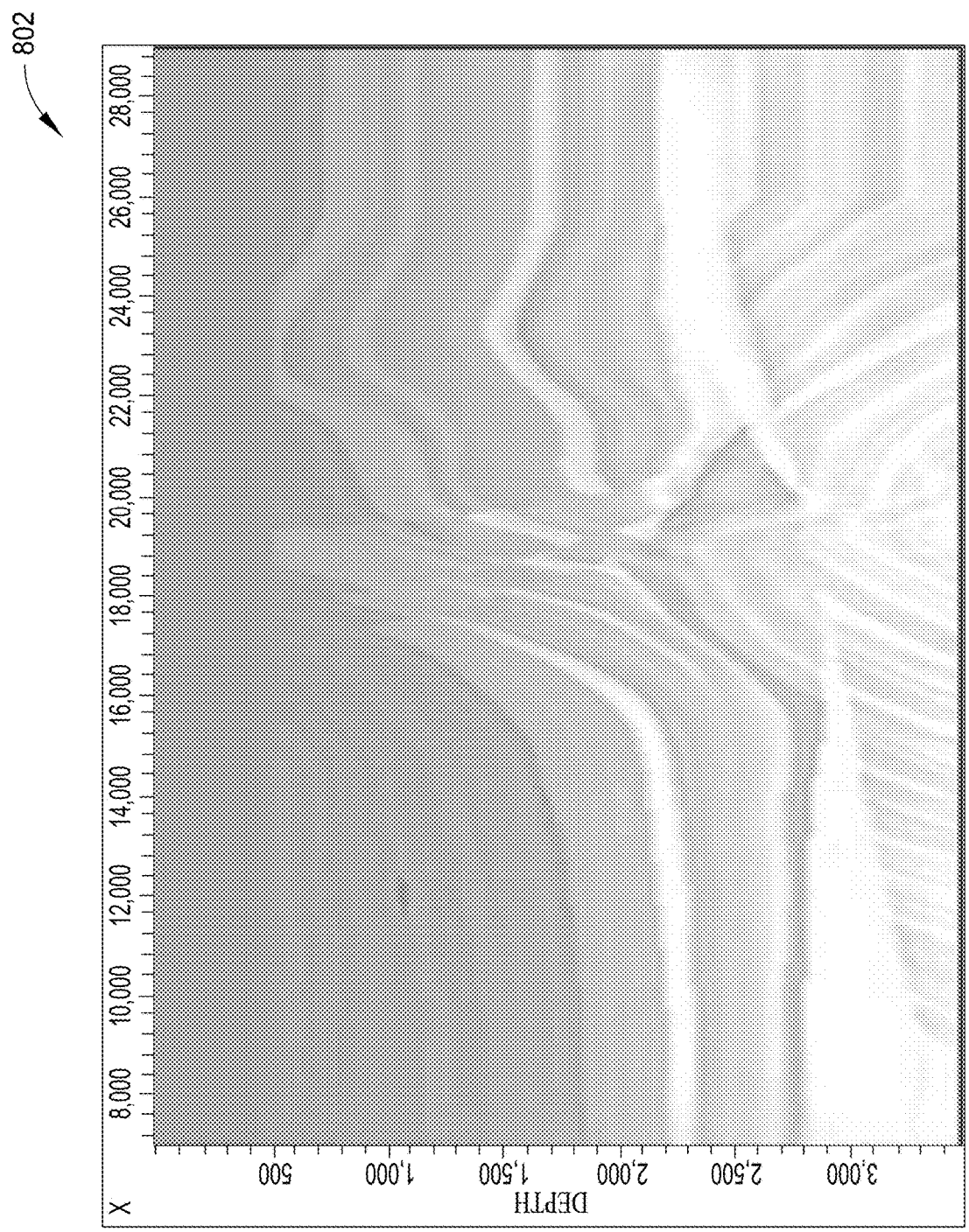
FIG. 9 illustrates an earth model resulting from Full Wavefield Inversion of the simultaneous-source shot gathers, one of which is shown in FIG. 8.

FIG. 9 illustrates an earth model 802. As illustrated, lateral location is plotted along the horizontal axis, and depth is plotted on the vertical axis. Grayscale is used to indicate velocity: lighter shades indicate faster velocities, and darker shades indicate slower velocities. For clarity, other parameters, such as density, anisotropy, and attenuation are not shown. An FWI module may utilize simultaneous-source survey data, such as simultaneous-source survey data 700 shown in FIG. 8, to produce the earth model 802 shown in FIG. 9.

Figure 10:
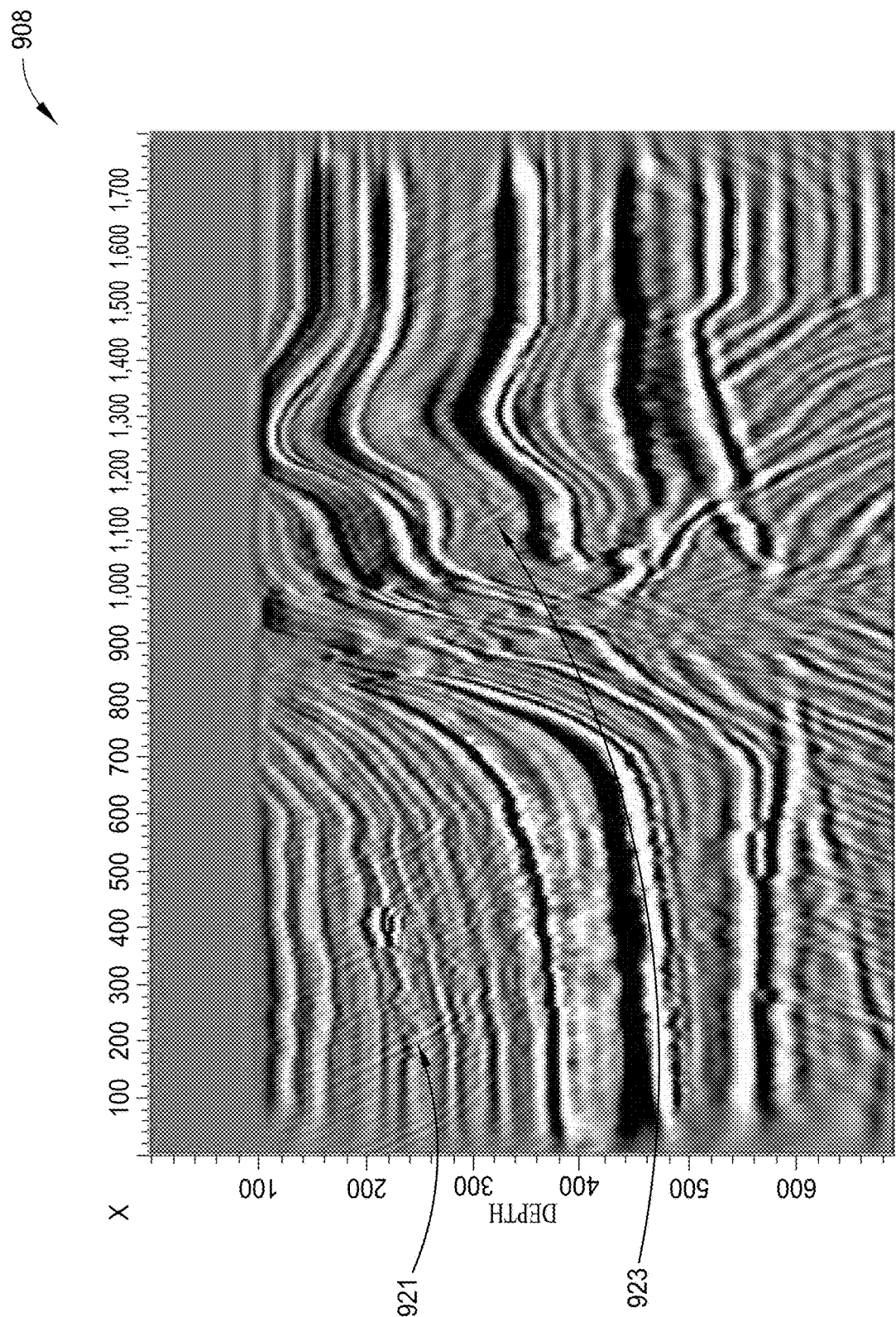
FIG. 10 illustrates a migrated image containing artifacts from an earlier source of the simultaneous-source shot gathers, one of which is shown in FIG. 8.

FIG. 10 illustrates a migrated image 908 from the simultaneous-source survey data 700. As illustrated, lateral location is plotted along the horizontal axis, and depth is plotted on the vertical axis. Migrated image 908 has been constructed from the source with the later direct-arrival time 704, thereby accepting artifacts from the source with the earlier direct-arrival time 702. Those skilled in the art of seismic imaging will recognize strong artifacts 921 in the upper left corner of migrated image 908. Other artifacts 923 in the center of migrated image 908 are more subtle and difficult to distinguish from steeply dipping earth strata or faults. Misinterpreting artifacts for actual strata could result in expensive and time-consuming drilling operations that do not reach hydrocarbon-bearing formations.

Figure 11:
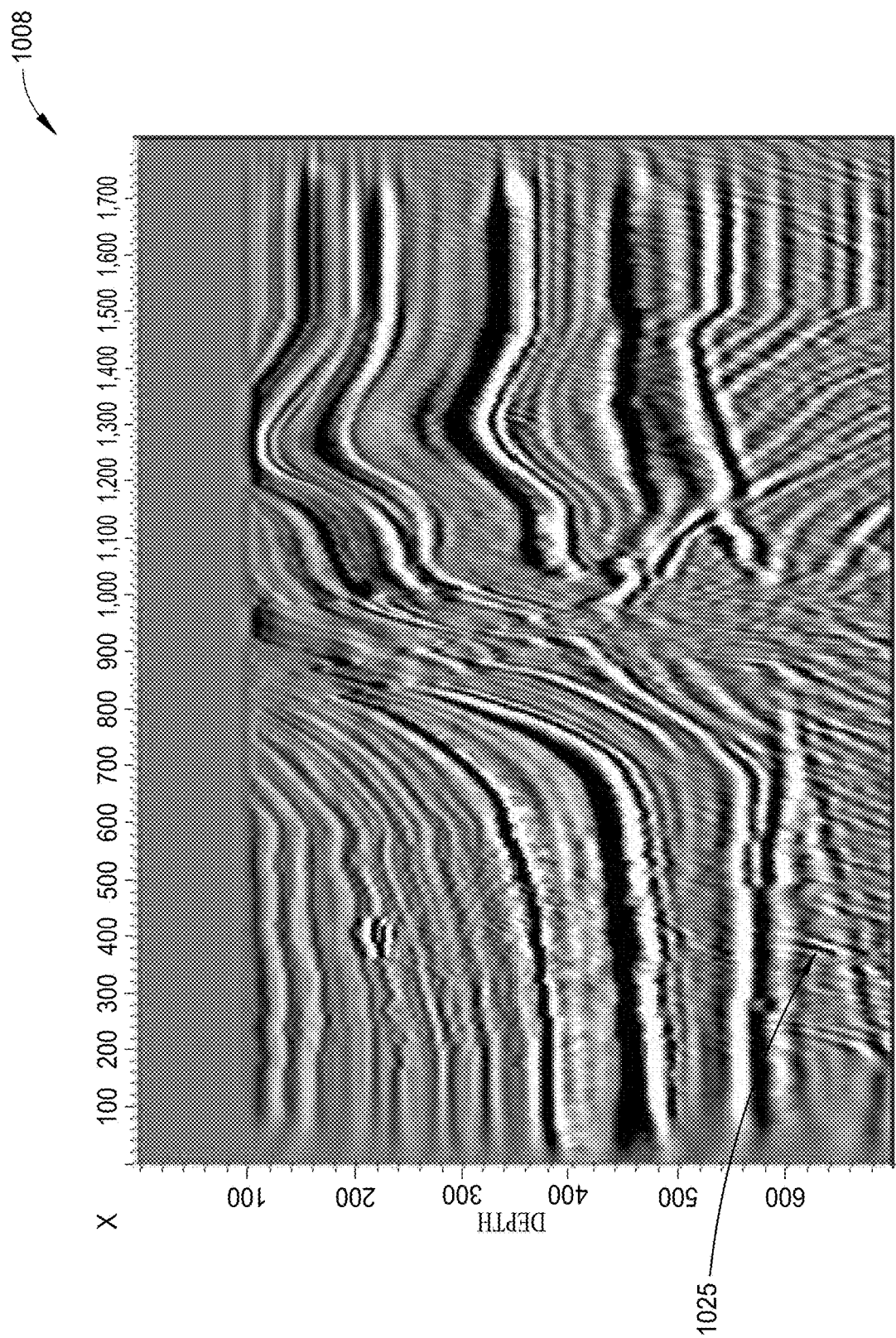
FIG. 11 illustrates a migrated image containing artifacts from a later source of the simultaneous-source shot gathers, one of which is shown in FIG. 8.

FIG. 11 illustrates another migrated image 1008 from the simultaneous-source survey data 700. As illustrated, lateral location is plotted along the horizontal axis, and depth is plotted on the vertical axis. Migrated image 1008 has been constructed from the source with the earlier direct-arrival time 702, thereby accepting artifacts from the source with the later direct-arrival time 704. Those skilled in the art of seismic imaging will recognize strong artifacts 1025 in the bottom section of migrated image 1008. Again, there are significant economic risks associated with misinterpreting the artifacts. In some embodiments, migrated image 908 may be summed with migrated image 1008 to construct a final migrated image with artifacts.

Figure 12:
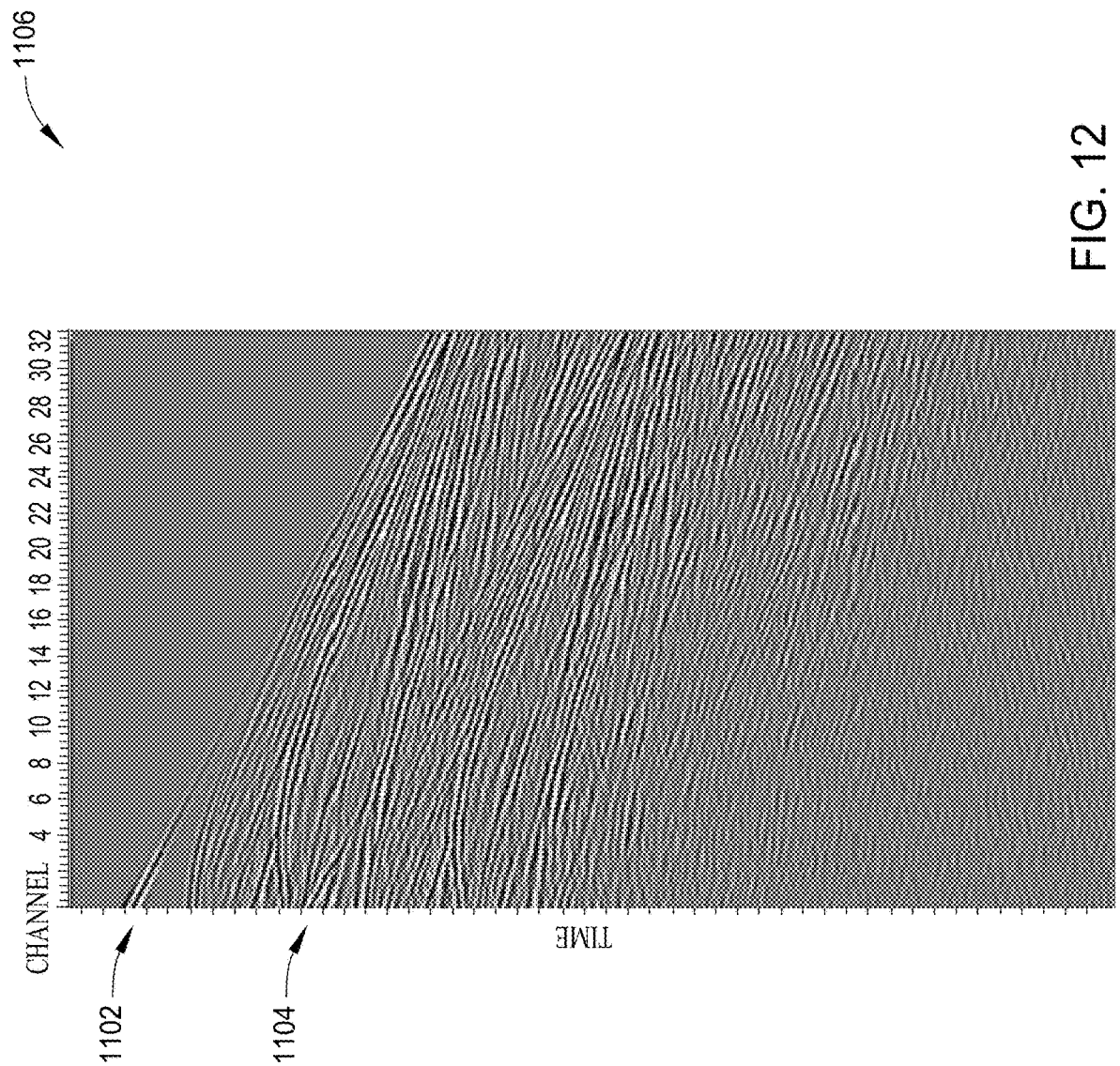
FIG. 12 illustrates a synthetic shot gather based on the simultaneous-source shot gather of FIG. 8.

Those skilled in the art of FWI will be aware of many techniques to synthesize survey data from simultaneous-source survey. Examples might include low-pass filtering, spectral shaping, muting, and least-squares migration/inversion (LSI). FIG. 12, for example, illustrates the result of muting a few of the leftmost seismic traces corresponding to the smallest source-receiver separations (offsets) and a few of the rightmost traces corresponding to the largest source-receiver separations (offsets) from simultaneous-source survey data 700 in FIG. 8. The result is synthetic survey data 1106 containing traces for which both sources were active (both the source with the earlier direct-arrival time 1102 and the source with the later direct-arrival time 1104). Mutes such as these can simplify the comparison of synthetic survey data to simultaneous-source survey data as part of the FWI module.

Figure 13:
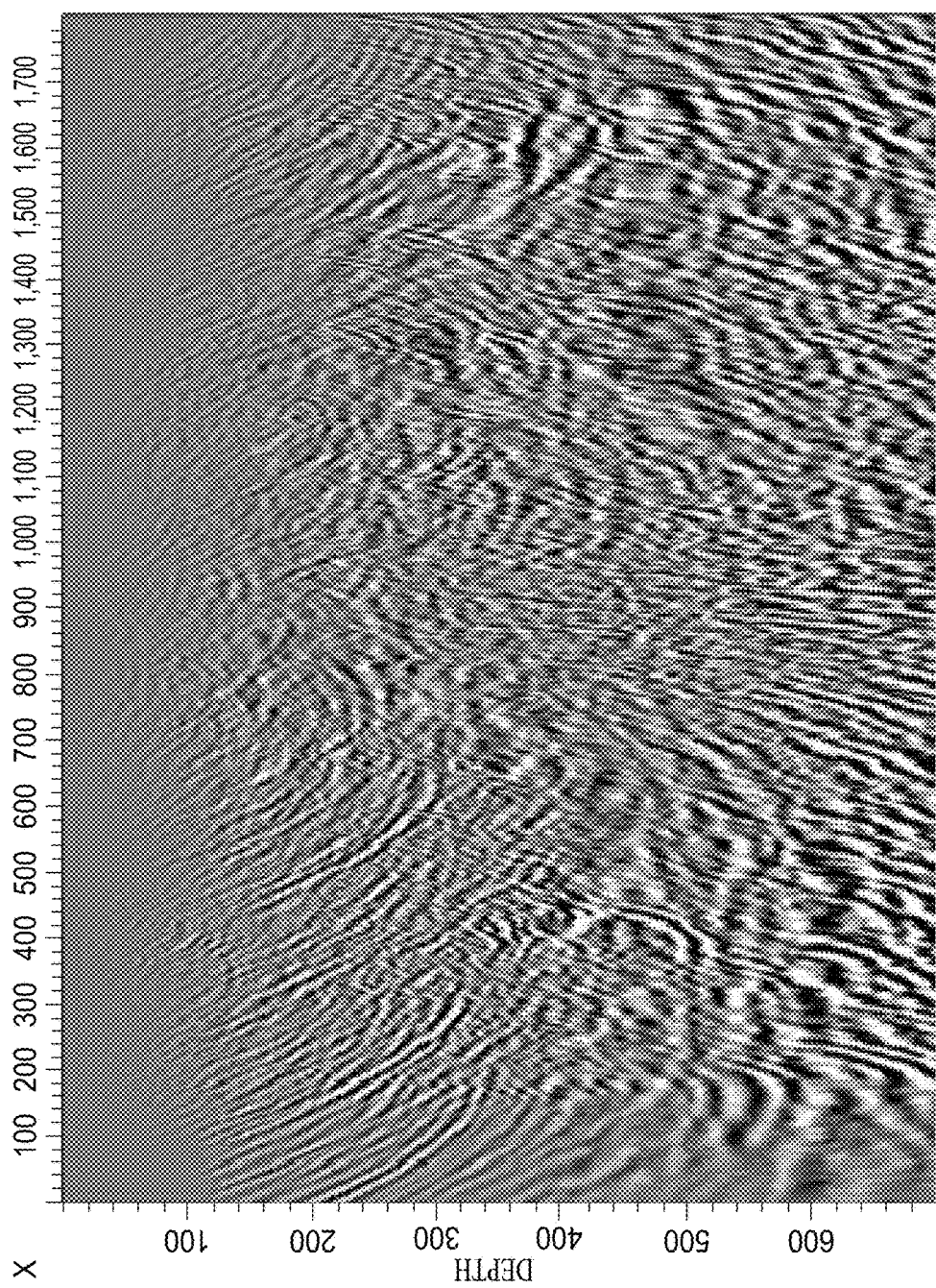
FIG. 13 illustrates migrated artifacts from the synthetic shot gathers, one of which shown in FIG. 12.

FIG. 13 illustrates an artifact image 1210. The artifact image 1210 may be constructed by migrating synthetic survey data 1106 from FIG. 12 to simulate artifacts (e.g., crosstalk artifacts). In some embodiments, synthetic survey data may be generated as conventional (i.e., non-simultaneous source) gathers. By doing so, artifact image 1210 can be migrated to consist entirely of artifacts. In practice, this may consist of associating each conventional synthetic gather with each of the interfering source activations in the corresponding simultaneous-source gather, skipping the source activation that gives rise to the conventional gather itself. By this process of selectively skipping source activation, artifact image 1210 consists entirely of artifacts corresponding to source activations from both the earlier- and later-direct-arrival times 702 and 704, as well as all other source activations in the dataset.

Figure 14:
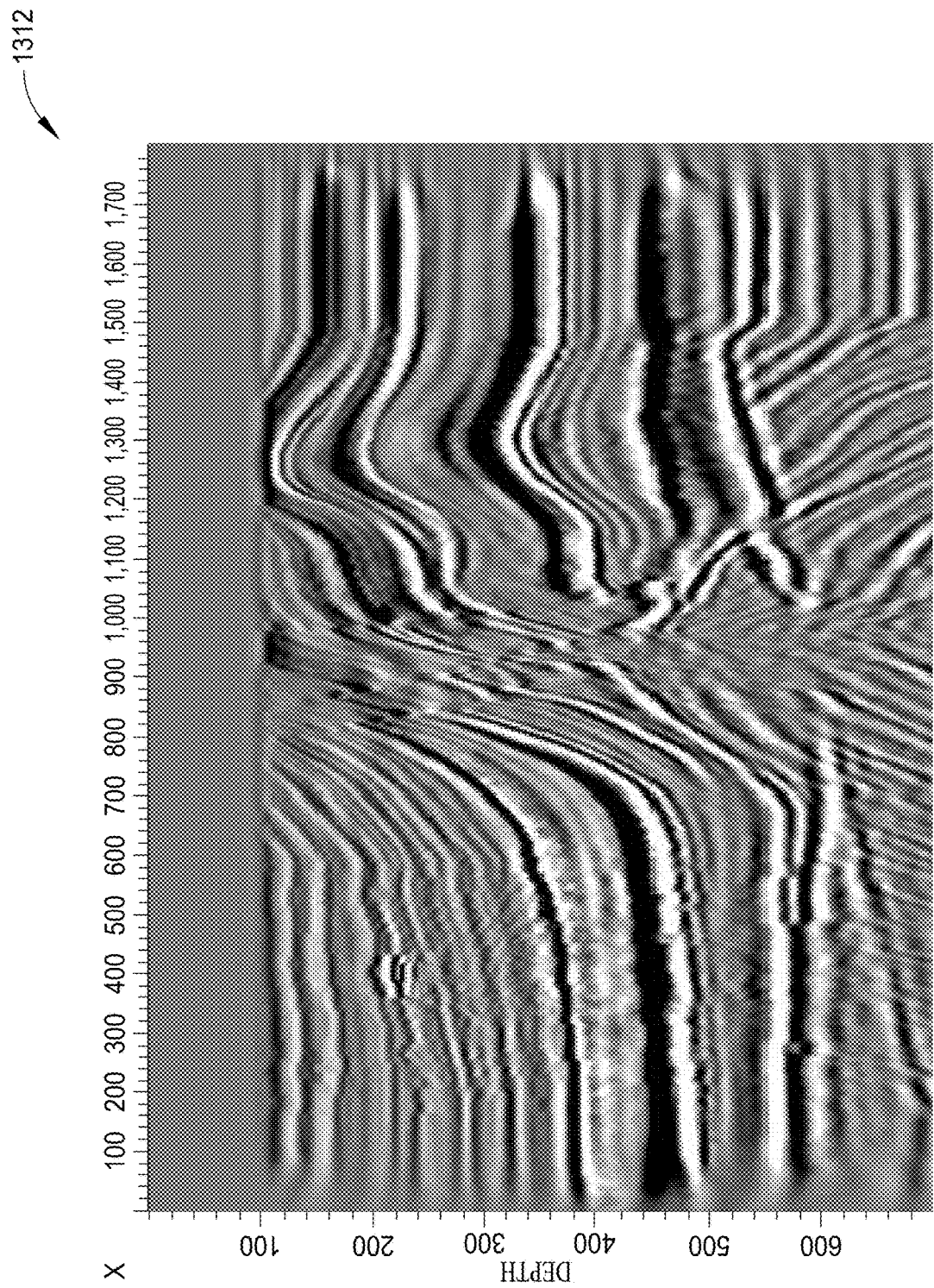
FIG. 14 illustrates an artifact-reduced, migrated image of the simultaneous-source shot gathers.

FIG. 14 shows the result of subtracting artifact image 1210 from the sum of migrated image 908 and migrated image 1008 to produce an artifact-reduced image 1312. The elimination of artifacts throughout the image is apparent upon comparison to images 908 and 1008. Comparing artifact-reduced image 1312 to migrated image 908 and/or migrated image 1008 visually demonstrates the improvements possible by utilizing methods disclosed herein. Moreover, improved images, such as artifact-reduced image 1312, may be produced in less time, more efficiently, and with lower costs than conventional techniques, such as deblending.

The techniques disclosed herein are applicable to a variety of simultaneous-source survey acquisition geometries. For example, survey data may be acquired by seismic sensors on streamers and/or ocean-bottom sensors (OBS) from source points near the surface. However, in typical seismic surveys, there are far fewer ocean-bottom sensors than there are shot points. It may be computationally efficient to exploit the mathematical principle of reciprocity when using OBS data for migration or FWI. Reciprocity implies that OBS data may be migrated or synthesized as if a source had been located on the seafloor and the data recorded by sensors near the surface. Unfortunately, reciprocity is a statement about particular pairs of shots and sensors, and may not apply well to simultaneous-source survey data in a blended form.

In practical applications, the present technological advancement may be used in conjunction with a computer, programmed in accordance with the disclosures herein. Preferably, in order to efficiently perform FWI, the computer is a high performance computer ("HPC"), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

FIG. 15 is a block diagram of a computer system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 15, additional CPUs may be present. Moreover, the computer system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The computer system 9900 may also include computer components such as non-transitory, computer-readable media. Examples of computer-readable media include a random access memory ("RAM") 9906, which may be SRAM, DRAM, SDRAM, or the like. The computer system 9900 may also include additional non-transitory, computer-readable media such as a read-only memory ("ROM") 9908, which may be PROM, EPROM, EEPROM, or the like. RAM 9906 and ROM 9908 hold user and system data and programs, as is known in the art. The computer system 9900 may also include an input/output (I/O) adapter 9910, a communications adapter 9922, a user interface adapter 9924, one or more graphic processing units (GPU) 9914, a display driver 9916, and a display adapter 9918.

The I/O adapter 9910 may connect additional non-transitory, computer-readable media such as a storage device(s) 9912, including, for example, a hard drive, a compact disc ("CD") drive, a floppy disk drive, a tape drive, and the like to computer system 9900. The storage device(s) may be used when RAM 9906 is insufficient for the memory requirements associated with storing data for operations of the present techniques. The data storage of the computer system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the computer system 9900. The display adapter 9918 is driven by the CPU 9902 to control the display on a display device 9920 to, for example, present information to the user regarding available plug-ins.

The architecture of system 9900 may be varied as desired. For example, any suitable processor-based device may be used, including without limitation personal computers, laptop computers, computer workstations, and multi-processor servers. Moreover, the present technological advancement may be implemented on application specific integrated circuits ("ASICs") or very large scale integrated ("VLSI") circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 9900 may include various plug-ins and library files. Input data may additionally include configuration information.

Particular embodiments may, for example, be in accordance with methods of hydrocarbon management, comprising: (i) obtaining simultaneous-source survey data for a subsurface formation; (ii) obtaining an earth model of the subsurface formation; (iii) obtaining a first velocity model of the subsurface formation; (iv) obtaining a second velocity model of the subsurface formation; (v) generating synthetic survey data with at least one of the earth model, the first velocity model, and the second velocity model; (vi) directly migrating the simultaneous-source survey data with the first velocity model to generate migrated simultaneous-source survey data with crosstalk artifacts; (vii) migrating the synthetic survey data with the second velocity model to generate migrated synthetic survey data with synthesized crosstalk artifacts; (viii) subtracting the migrated synthetic survey data from the migrated simultaneous-source survey data to produce an artifact-reduced image; and (ix) utilizing the artifact-reduced image for at least one of: hydrocarbon extraction, hydrocarbon production, hydrocarbon exploration, identifying potential hydrocarbon-bearing formations, characterizing hydrocarbon-bearing formations, identifying well locations, determining well injection rates, determining well extraction rates, identifying reservoir connectivity, acquiring hydrocarbon resources, disposing of hydrocarbon resources, abandoning hydrocarbon resources, and reviewing prior hydrocarbon management decisions.

Other embodiments may include a system for generating an image of a subsurface formation comprising: (a) a module for generating a velocity model of the subsurface formation; (b) a module for directly migrating simultaneous-source survey data for the subsurface formation based on the velocity model; (c) a module for generating synthetic survey data for the subsurface formation; (d) a module for migrating the synthetic survey data based on the velocity model; and (e) a module for subtracting the migrated synthetic survey data from the migrated simultaneous-source survey data.

In some systems according to such embodiments, at least one of the module for generating the velocity model and the module for generating synthetic survey data comprises a Full Wavefield Inversion ("FWI") module. Such FWI module may be configured to receive the simultaneous-source survey data as input.

Also or instead, the module for directly migrating the simultaneous-source survey data may be configured to perform at least one of: reverse-time migration, wave-equation migration, Kirchhoff migration, and elastic migration. Also or instead, the module for subtracting the migrated synthetic survey data from the migrated simultaneous-source survey data may be configured to perform adaptive subtraction.

Systems according to some embodiments may also include a module for displaying an artifact-reduced image as output from the module for subtracting the migrated synthetic survey data from the migrated simultaneous-source survey data.

According to yet further embodiments, a non-transitory computer readable medium may be provided, the medium comprising executable instructions that when executed cause a processor to: obtain simultaneous-source survey data for a subsurface formation; obtain an earth model of the subsurface formation; obtain a first velocity model of the subsurface formation; obtain a second velocity model of the subsurface formation; generate synthetic survey data with at least one of the earth model, the first velocity model, and the second velocity model; directly migrate the simultaneous-source survey data with the first velocity model to generate migrated simultaneous-source survey data with crosstalk artifacts; migrate the synthetic survey data with the second velocity model to generate migrated synthetic survey data with synthesized crosstalk artifacts; and subtract the migrated synthetic survey data from the migrated simultaneous-source survey data.

Yet further embodiments may include a seismic data analysis system comprising: a processor; and a display configured to display graphical representations of a seismic data set, wherein the seismic data analysis system is configured to: obtain simultaneous-source survey data for a subsurface formation; obtain an earth model of the subsurface formation; obtain a first velocity model of the subsurface formation; obtain a second velocity model of the subsurface formation; generate synthetic survey data with at least one of the earth model, the first velocity model, and the second velocity model; directly migrate the simultaneous-source survey data with the first velocity model to generate migrated simultaneous-source survey data with crosstalk artifacts; migrate the synthetic survey data with the second velocity model to generate migrated synthetic survey data with synthesized crosstalk artifacts; and subtract the migrated synthetic survey data from the migrated simultaneous-source survey data to produce an artifact-reduced image.

Yet further embodiments may include improved methods for generating an image of a subsurface formation, the improvement of which comprises: directly migrating simultaneous-source survey data with a first velocity model to generate migrated simultaneous-source survey data with crosstalk artifacts; and subtracting migrated synthetic survey data from the migrated simultaneous-source survey data to generate an artifact-reduced image, the method comprising: (i) generating synthetic survey data for the subsurface formation with at least one of an earth model, the first velocity model, and a second velocity model; and (ii) migrating the synthetic survey data with the second velocity model to generate the migrated synthetic survey data with synthesized crosstalk artifacts.

In such improved methods, the synthesized crosstalk artifacts may approximate the crosstalk artifacts; the first velocity model may be the same as the second velocity model; and/or at least one of the first and second velocity models, and/or the earth model, may be generated with FWI. Also or instead, at least a portion of the simultaneous-source survey data may be input to at least one of the earth model, the first velocity model, and the second velocity model; also or instead, the direct migration may comprise at least one of reverse-time migration, wave-equation migration, Kirchhoff migration, and elastic migration. According to such methods, the subtracting may also comprise adaptive subtraction; and/or the simultaneous-source survey data may comprise data from a plurality of shots, and data from at least one of the plurality of shots may be used to generate the synthetic survey data.

Such methods may further include managing hydrocarbons based at least in part upon the generated artifact-reduced image.

The foregoing description is directed to particular example embodiments of the present technological advancement. It will be apparent, however, to one skilled in the art, that many modifications and variations to the embodiments described herein are possible. All such modifications and variations are intended to be within the scope of the present invention, as defined in the appended claims.

What is claimed is:

1. A method for generating an image of a subsurface formation comprising:
    obtaining simultaneous-source survey data for the subsurface formation;
    obtaining an earth model of the subsurface formation;
    obtaining a first velocity model of the subsurface formation;
    obtaining a second velocity model of the subsurface formation;
    generating synthetic survey data with at least one of the earth model, the first velocity model, and the second velocity model;
    directly migrating the simultaneous-source survey data with the first velocity model to generate migrated simultaneous-source survey data with crosstalk artifacts;
    migrating the synthetic survey data with the second velocity model to generate migrated synthetic survey data with synthesized crosstalk artifacts;
    subtracting the migrated synthetic survey data from the migrated simultaneous-source survey data; and
    generating an image of the subsurface based at least in part upon the subtraction of the migrated synthetic survey data from the migrated simultaneous-source survey data.

2. The method of claim 1, wherein the synthesized crosstalk artifacts approximate the crosstalk artifacts.

3. The method of claim 1, wherein the first velocity model is the same as the second velocity model.

4. The method of claim 1, wherein at least one of the earth model, the first velocity model, and the second velocity model is generated with Full Wavefield Inversion ("FWI").

5. The method of claim 1, wherein at least a portion of the simultaneous-source survey data is input to at least one of the earth model, the first velocity model, and the second velocity model.

6. The method of claim 5, further comprising deblending the portion of the simultaneous-source survey data as input to the earth model.

7. The method of claim 1, wherein the earth model is the same as at least one of the first velocity model and the second velocity model.

8. The method of claim 1, wherein the earth model is input to at least one of the first velocity model and the second velocity model.

9. The method of claim 8, wherein a conditioning operation is performed on the earth model as input to at least one of the first velocity model and the second velocity model.

10. The method of claim 9, wherein the conditioning operation comprises at least one of smoothing, dip filtering, de-noising, time-depth conversion, and tying to well logs.

11. The method of claim 1, wherein the subtracting the migrated synthetic survey data from the migrated simultaneous-source survey data results in an artifact-reduced image.

12. The method of claim 1, wherein the direct migration comprises at least one of reverse-time migration, wave-equation migration, Kirchhoff migration, and elastic migration.

13. The method of claim 1, wherein the subtracting comprises adaptive subtraction.

14. The method of claim 1, wherein:
    the simultaneous-source survey data comprises data from a plurality of shots, and
    data from at least one of the plurality of shots is used to generate the synthetic survey data.

15. The method of claim 1, wherein the generating the synthetic survey data comprises generating blended data and deblending the generated blended data.

16. The method of claim 1, further comprising:
    managing hydrocarbons based at least in part upon the generated image.

17. A method for generating an image of a subsurface formation comprising:
    obtaining simultaneous-source survey data for the subsurface formation;
    obtaining an earth model of the subsurface formation;
    obtaining a velocity model of the subsurface formation;
    generating synthetic survey data with at least one of the earth model and the velocity model;
    subtracting the synthetic survey data from the simultaneous-source survey data;
    directly migrating the result of the subtraction with the velocity model; and
    generating the image of the subsurface formation based at least in part upon the direct migration.

18. The method of claim 17, wherein at least one of the earth model and the velocity model is generated with Full Wavefield Inversion ("FWI").

19. The method of claim 17, wherein at least a portion of the simultaneous-source survey data is input to at least one of the earth model and the velocity model.

20. The method of claim 19, further comprising deblending the portion of the simultaneous-source survey data as input to the earth model.

21. The method of claim 17, wherein the earth model is the same as the velocity model.

22. The method of claim 17, wherein the earth model is input to the velocity model.

23. The method of claim 22, wherein a conditioning operation is performed on the earth model as input to the velocity model.

24. The method of claim 23, wherein the conditioning operation comprises at least one of smoothing, dip filtering, de-noising, time-depth conversion, and tying to well logs.

25. The method of claim 17, wherein the migrating the result of the subtraction results in an artifact-reduced image.

26. The method of claim 17, wherein the migration comprises at least one of reverse-time migration, wave-equation migration, Kirchhoff migration, and elastic migration.

27. The method of claim 17, wherein the subtracting comprises adaptive subtraction.

28. The method of claim 17, wherein:
the simultaneous-source survey data comprises data from a plurality of shots, and
data from at least one of the plurality of shots is used to generate the synthetic survey data.

29. The method of claim 17, further comprising:
using the directly migrated result to generate an image of the subsurface formation; and
managing hydrocarbons based at least in part upon the generated image.

* * * * *